UNITED STATES PATENT OFFICE

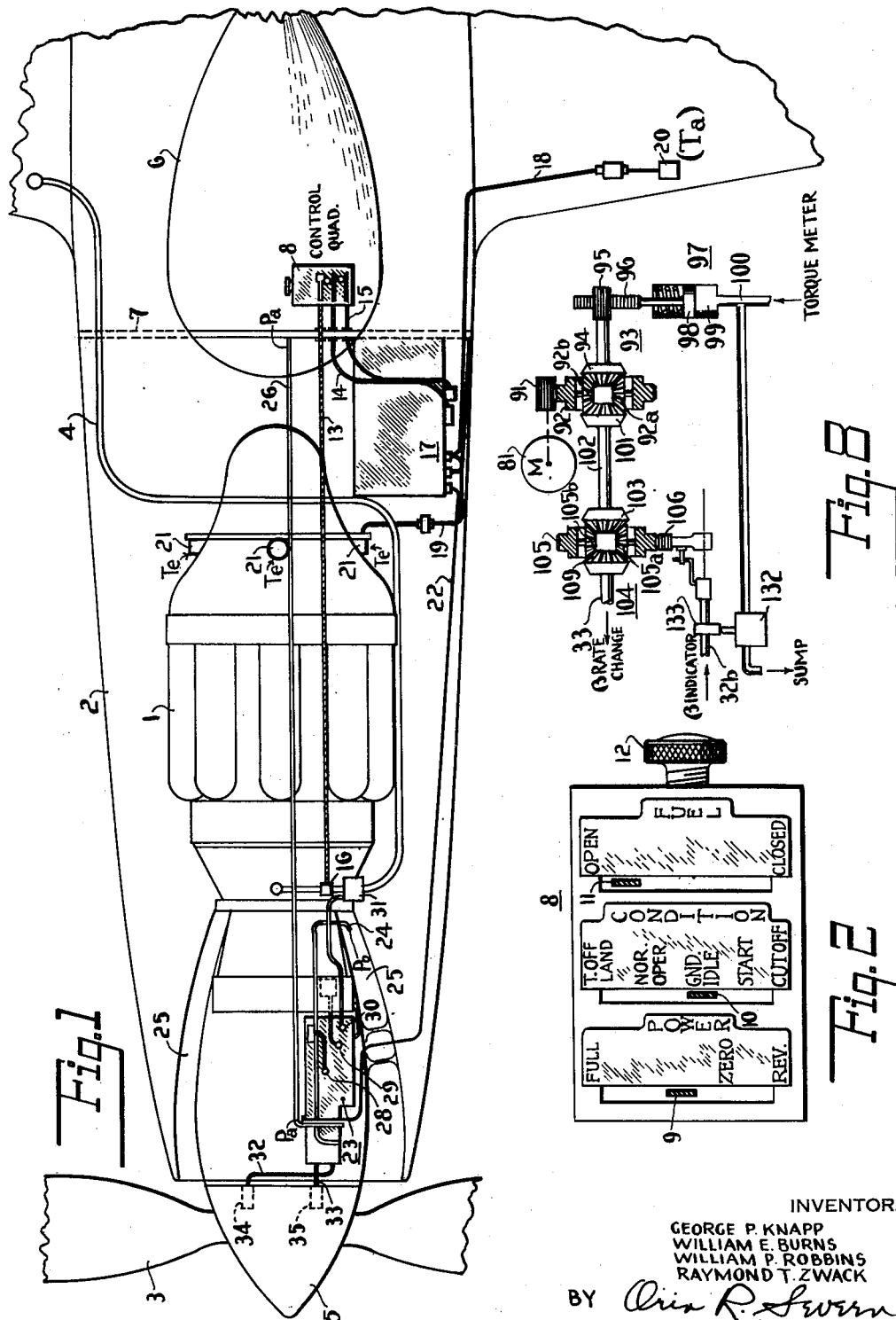

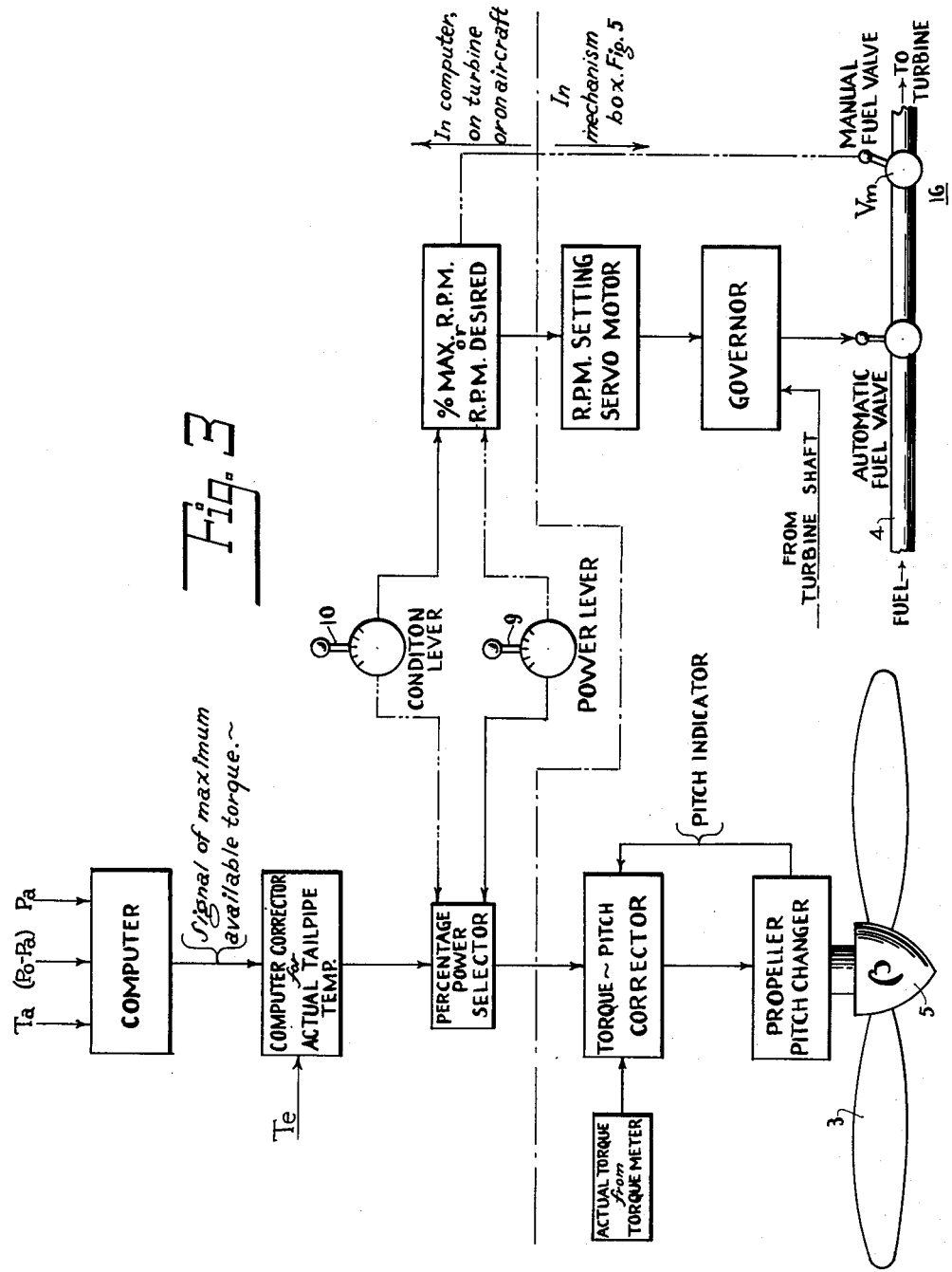

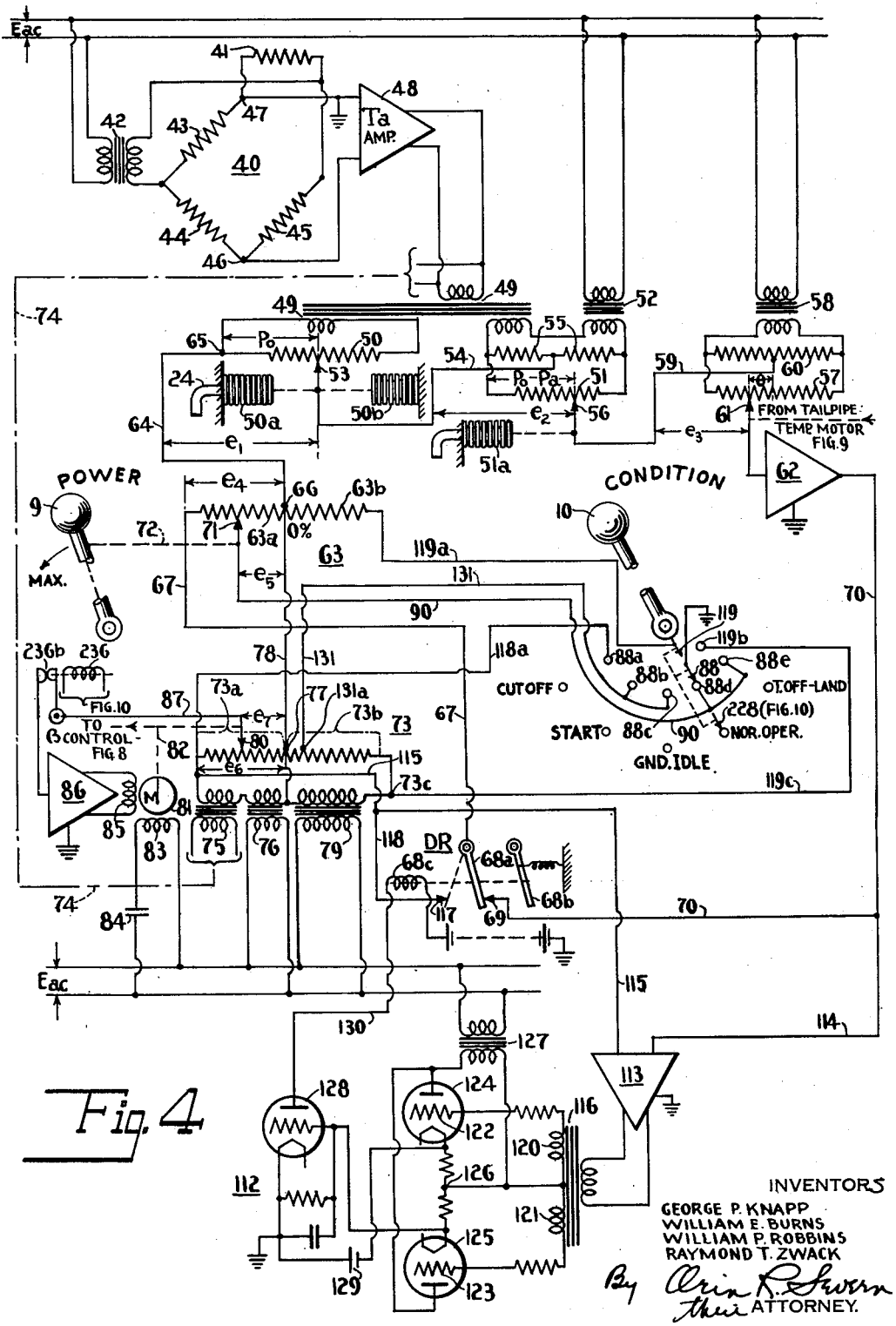

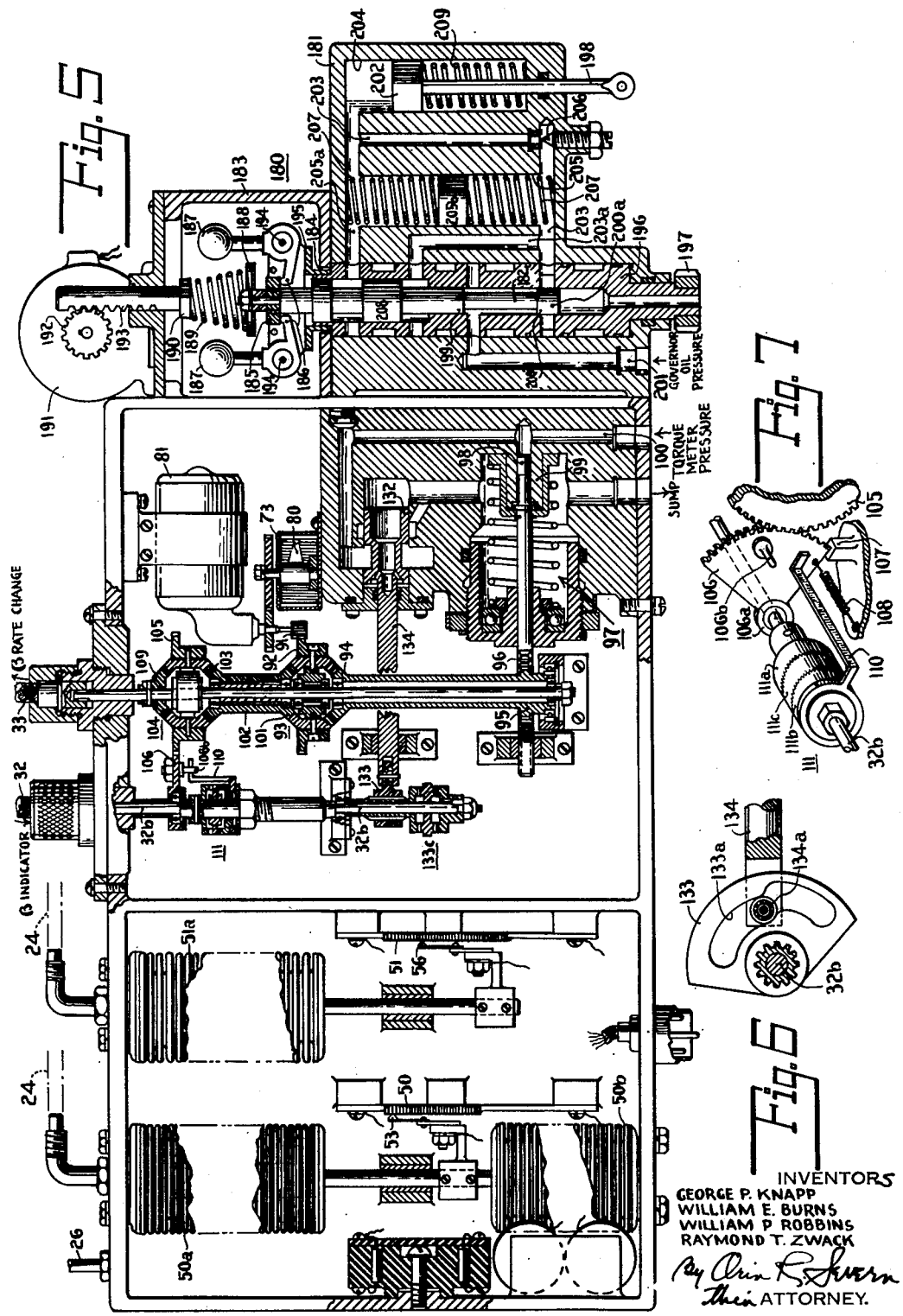

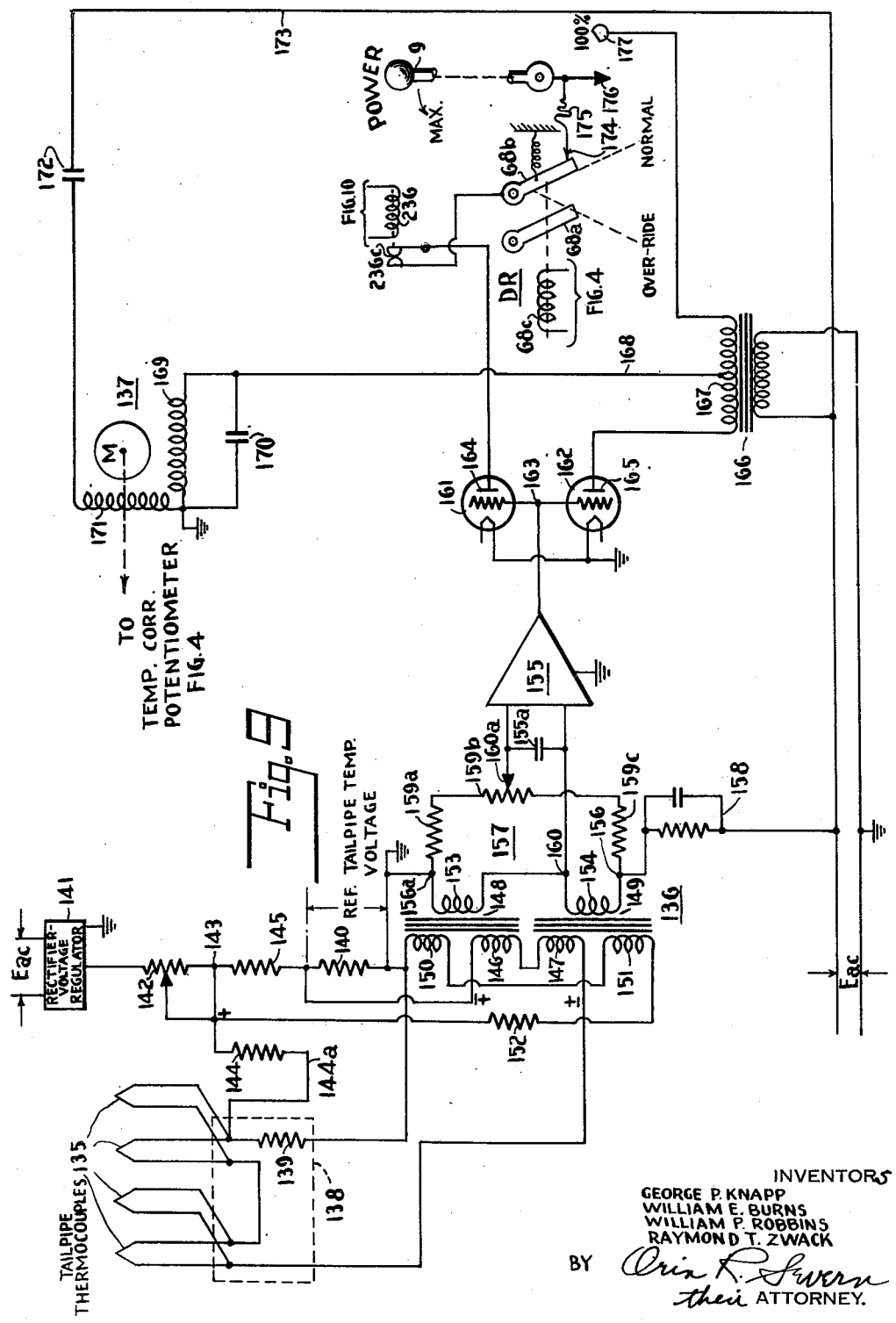

2,640,550

TURBINE PROPELLER CONTROL SYSTEM

George P. Knapp, Verona, William E. Burns, Denville, and William P. Robbins and Raymond T. Zwack, Caldwell, N. J., assignors to Curtiss-Wright Corporation, a corporation of Delaware Application July 24, 1948, Serial No. 40,476

41 Claims. (Cl. 170—135.72)

This invention relates to prime mover and load control and particularly to a system for controlling within practical limits the operation of a turbine-propeller combination comprising essentially a gas turbine including a compressor, and a variable pitch propeller driven by the turbine.

The invention comprises, in part, improvements over the disclosure of application Serial No. 694,398 filed August 31, 1946, in the names of Kochenberger, Chillson and Knapp.

In this type of apparatus a gas-driven turbine and an air compressor may be mounted on a common operating shaft so that the turbine drives the compressor for delivering air in needed quantity to the turbine combustion chamber. Liquid fuel is admitted to the combustion chamber according to the load requirements as represented by a variable pitch propeller connected usually by means of reduction gearing to the turbine shaft. When used in aircraft during flight the compressor receives ambient air already boosted in pressure by ram action and delivers it at a pressure of several atmospheres to the combustion chamber in excess of combustion requirements, where part of it maintains combustion and the balance mixes with the highly heated products of combustion partially to cool the combustion gases. This high temperature gas mixture constitutes the motive fluid which is directed under considerable pressure so as to operate the turbine according to either the impulse or reaction principle, and then vented through the turbine tailpipe to atmosphere. The temperature of the tailpipe gases or of the gases in the burners at predetermined or rated turbine R. P. M. is representative of turbine torque since for a given set of flight conditions the torque-tailpipe temperature relationship in a constant speed gas turbine is for practical purposes linear. The tailpipe temperature or combustion chamber temperature also represents the limit of permissible temperature for the turbine blades.

Under normal torque and temperature operating conditions the turbine fuel supply and the propeller pitch should be automatically controlled by preset R. P. M. and power controls operated by the pilot. For obtaining stable and precise automatic control, it has previously been proposed to control turbo-propeller combinations in various coordinated ways for example by varying the fuel input in accordance with turbine temperature and also by varying propeller pitch according to the conjoint operation of the turbine governor and a manually controlled device representing power setting. Many of these prior art systems have serious disadvantages due for example to time lag in temperature control and to insufficient or improper coordination of the various control factors tending to cause sluggish response, or "over-shooting" resulting in unstable operation.

One of the most serious disadvantages in prior turbine control systems of the computing type for aircraft is the failure to realize and/or to limit full operating power under varying flight conditions. For example, variable factors such as ambient temperature, ambient pressure and ram pressure, i. e. the pressure at the compressor intake due to the ram action of the aircraft in flight, determine the turbine shaft torque that can be developed at a given turbine temperature, assuming that R. P. M. is held constant. Also the torque is affected by air speed, decreasing as the ratio of the ram absolute pressure to ambient absolute pressure decreases, other factors being equal. Under conditions such as low altitude and low ambient temperature (tailpipe temperature and turbine R. P. M. being constant) the torque available may exceed the mechanical limits of the turbine gearing, etc., whereas under high temperature or high altitude conditions at the same R. P. M. and tailpipe temperature, the torque available may be considerably less than the aforesaid limits. Accordingly any computing type of control that fails properly to take into consideration variable flight conditions either limits the turbine to unnecessarily low output or imposes a risk of structural damage to the turbine at maximum power.

It is therefore an object of the present invention to provide an improved turbo-propeller control system for aircraft that is operable automatically to expand or contract the power calibration of the pilot's power lever according to the existing flight conditions so that maximum power can be realized for the less favorable conditions without exceeding the turbine temperature limit, and so that the mechanical limits of the turbine are not exceeded for more favorable conditions, without limiting the actual or effective stroke of the power lever.

Another object of the invention is to provide an improved system of the above character for obtaining precise control of turbine R. P. M., rapid and precise control of turbine temperature at or near maximum power and for precluding objectionable transients of R. P. M., turbine temperature or thrust accompanying R. P. M. or power changes.

Another object of the invention is to provide means for obtaining improved operation under low airspeed or low power conditions, including control of propeller thrust at low power with means for obtaining substantially zero thrust; selective reverse pitch for aerodynamic braking at landing airspeeds; feathering, and means for obtaining the minimum torque angle during starting.

The invention will be more fully set forth in the following description referring to the accompanying drawings, and the features of novelty which characterize the invention will be pointed out with particularity in the claims annexed to and forming a part of this specification.

Referring to the drawings:

Fig. 1 is an exposed plan view of the forward part of an airplane fuselage illustrating the general arrangement of a turbo-propeller combination together with associated control equipment to which the present invention is applicable;

Fig. 2 is an enlarged plan view of the pilot's control quadrant shown in Fig. 1 indicating various control lever positions that may be selected by the pilot;

Fig. 3 is a block schematic diagram illustrating the general relationship between the principal component parts of the control system embodying the present invention;

Fig. 4 is a diagrammatic illustration of an electrical system for computing available turbine shaft torque and for determining torque limits;

Fig. 5 is an elevational view mainly in section of mechanical control equipment associated with various parts including the turbine proper, the propeller pitch changing mechanism and the computing circuits;

Fig. 6 is an enlarged detail view of the dump valve cam structure shown in Fig. 5;

Fig. 7 is an enlarged view illustrating in perspective details of adjustable pitch controlling means shown in Fig. 5;

Fig. 8 is a simplified lay-out of the differential mechanism shown in Fig. 5 for illustrating the essential operation thereof;

Fig. 9 is a diagrammatic illustration of another part of the computing and control system including tailpipe or combustion chamber temperature responsive means for effecting temperature correction of computed torque;

Figure 10:
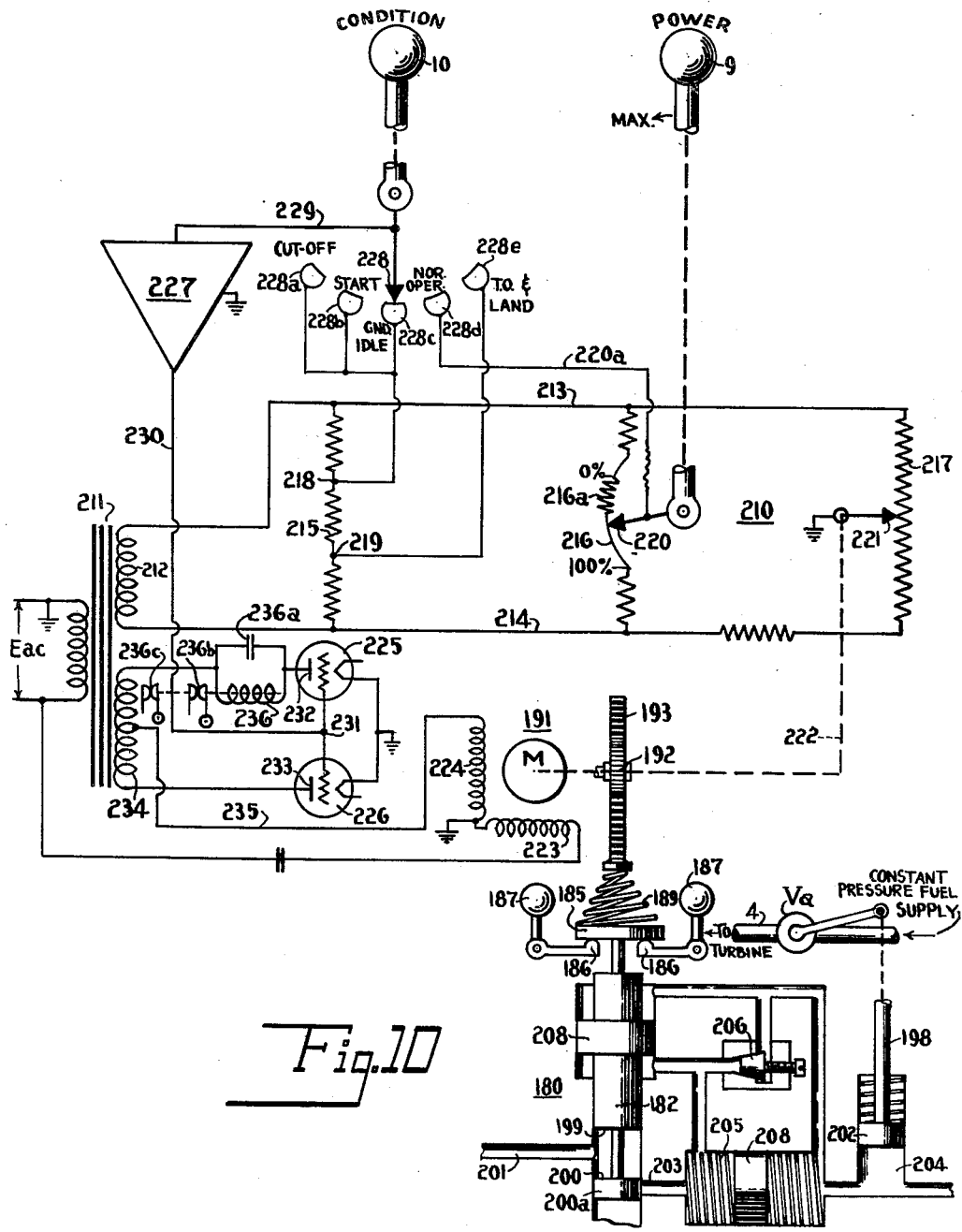
Figure 11:
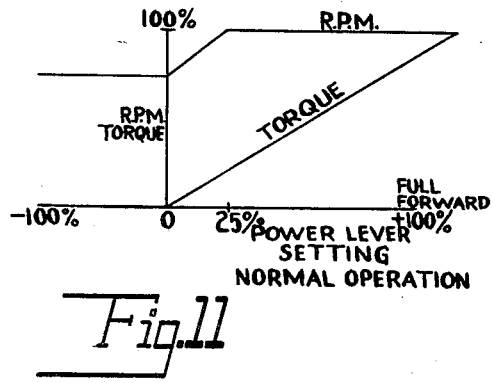
Figure 12:
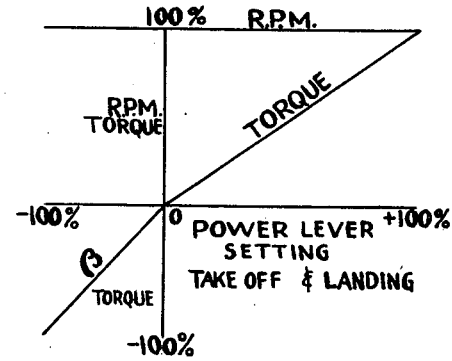
Figure 13:
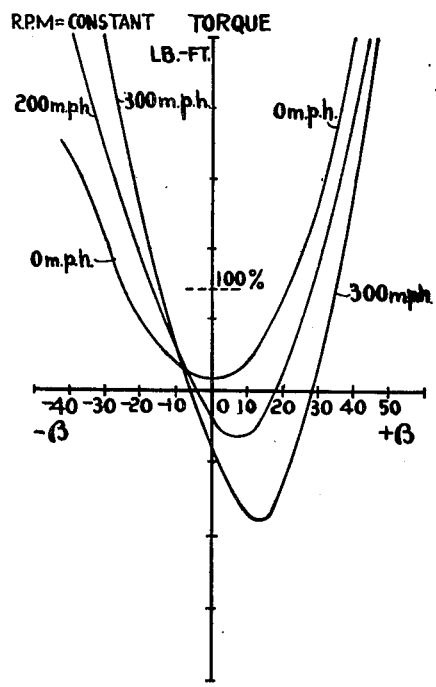
Figure 14:
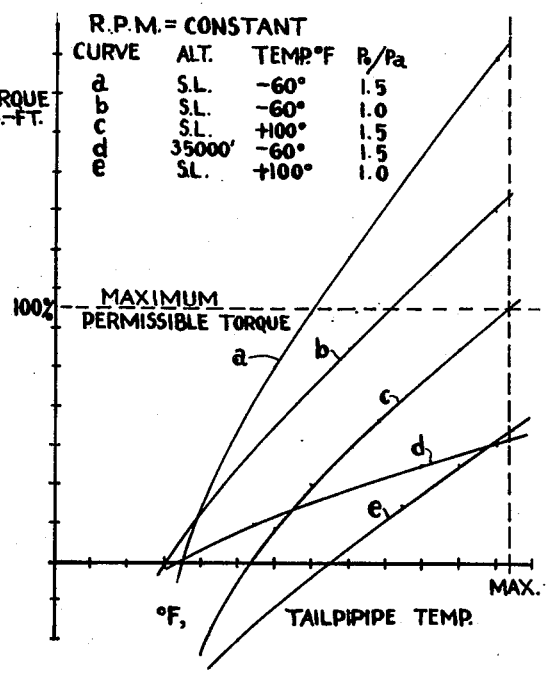

Fig. 10 is a diagrammatic illustration of another part of the computing and control system including the governor control circuit for regulating tubine R. P. M.;

Figs. 11 and 12 graphically illustrate different operating schedules for the turbo-propeller system;

Fig. 13 graphically illustrates certain operating characteristics of a variable pitch propeller; and Fig. 14 graphically illustrates turbine operating characteristics.

A turbine-propeller combination of the type to which the present invention is applicable is shown generally in Fig. 1 which represents a single engine installation wherein a gas turbine 1 is suitably mounted within the forward part of an aircraft fuselage 2 (shown exposed) for driving a variable pitch porpeller 3. The turbine which receives fuel from a fuel line 4 is connected to the propeller through speed reducing means such as reduction gearing (not shown), and the propeller pitch changing mechanism (also not shown) can be considered as located within the spinner 5. The pilot's cockpit 6 as viewed from above is located to the rear of the turbine and includes an instrument panel generally indicated at 7 and the pilot's control quadrant 8.

The control quadrant is shown as it would be viewed by the pilot in more detail by Fig. 2 and includes according to the present invention three manually operable levers, namely a power lever 9 calibrated in percentage of available power and operable to the positions of "full," "zero" and "reverse" power, a "condition" lever 10 operable to any one of five positions hereinafter described for providing flexible and efficient operation under varying flight and ground conditions and a fuel lever 11 for manual control of the turbine fuel line 4. The control quadrant includes all the preset or adjustable controls that are required by the pilot for practicing the present invention. The "feel" of the levers can be adjusted by means including a knob 12 which, in well known manner, regulates the frictional drag on the levers coincidentally.

In the arrangement shown, the fuel lever is connected by a flexible cable 13 to a fuel valve 16 in the line 4 and the power and condition levers are connected by flexible cables 14 and 15 to electrical computing apparatus hereinafter described generally indicated at 17. The computing apparatus is also electrically connected by conducting cables 18 and 19 to temperature responsive devices 20 and 21 located respectively on a wing of the aircraft and in the turbine tailpipe for indicating ambient air and tailpipe temperatures. Also the computer is connected by an electric cable 22 to a plurality of pressure responsive devices and a servomotor located in the turbine control compartment generally indicated at 23.

The turbine control compartment is specifically shown by Fig. 5 and includes the turbine governor control, propeller pitch control, and the aforesaid pressure responsive devices subject to both ambient atmospheric pressure and ram pressure. The ram pressure is obtained by means of an open-end tube 24 located in the compressor intake passage 25 so that it is subject to the ram action of the air during flight. The means responsive to ambient pressure may be connected by a line 26 to any stable source of ambient pressure such as the cockpit, assuming the cockpit is not pressurized. The turbine control compartment is also provided with fluid connections 28 and 29 (Fig. 1) representing respectively the pressure signal from the turbine torque meter and the governor oil intake, and also connection 30 from the governor for controlling the fuel pump 31 as will be hereinafter described in connection with Figs. 5 and 10. The fuel pump 31 although used in practice is not disclosed in detail herein, it being sufficient for present purposes to show a valve for regulating flow of fuel under constant pressure. The turbine control compartment also is connected by flexible cables 32 and 33 with devices 34 and 35 associated with the pitch changing mechanism for indicating the pitch angle and for effecting pitch change respectively. The device 35 may comprise known means for regulating the rate of pitch change of any preferred type. For instance, the apparatus shown in Mergen et al. patent application Serial No. 143,636, filed February 11, 1950, may be used.

The above description of Fig. 1 is intended mainly to indicate the general mechanical arrangement of the principal components of a turbo-propeller powered aircraft and its power control system according to the practice of the present invention, and to illustrate the manner in which the computing and control apparatus is associated with the propeller, the turbine proper and the pilot's control quadrant. The functional relationship of essential component parts of the control system is diagrammatically illustrated by Fig. 3 wherein the propeller pitch ($\beta$) changing mechanism and the turbine fuel line 4 are indicated as controlled according to the positioning of the torque (power) and condition levers 9 and 10 respectively and also according to the output of computing apparatus with respect to the instant indicated propeller pitch. The computer is controlled primarily by inputs involving several factors, namely ambient temperature, ambient pressure and ram pressure. As indicated, the adjustment of fuel flow at the governor controlled automatic fuel valve $V_a$ controls turbine R. P. M. whereas propeller pitch is normally adjusted according to power lever setting, torque computer output, and under certain conditions tailpipe temperature correction of the torque computer output.

In the foregoing, the terms "power" and "torque" have been used. Power from the turbine is a function of turbine R. P. M. and torque delivered in the propeller shaft. Power is also a function of thrust delivered by the propeller. Torque and thrust are both force components of power produced by the turbine. As was pointed out in earlier patent application Serial No. 694,398 filed August 31, 1946, there are several alternative power components or manifestations utilized for turbine control purposes, such as turbine temperature, torque, thrust, fuel flow and fuel-air ratio. The particular components of power which are useful as control components in the instant application are the force components, namely, torque delivered by the turbine to the propeller, or thrust produced by the propeller. The term "force components of power" used herein thus connotes either torque or thrust.

The advantages of this type of R. P. M. control can be readily understood from a brief consideration of the characteristics of alternative control. For example control of R. P. M. can be obtained either by adjustment of propeller pitch or fuel flow, the turbine temperature being controlled by the factor that is not used to control R. P. M. If now it be assumed that R. P. M. is controlled according to the propeller blade angle, it will be seen from Fig. 13 that because of the reversal of slope that always occurs at some point in all curves of propeller torque as a function of the blade angle, the sense of blade angle control reverses at some blade angle, usually a low angle, and always at a point corresponding to a low turbine temperature. Furthermore, as the reversal point is approached, the control becomes increasingly sluggish and insensitive in action by reason of the comparatively flat slope of the curve near this point. Although turbine temperature is low as above noted at the reversal point so that temperature control can be safely relinquished at that part of the control range, R. P. M. control can never be relinquished since it is a primary requirement that the control be capable of maintaining maximum R. P. M. for all power conditions.

In a fuel flow control of R. P. M. on the other hand there is no such reversal of control sense nor is the control range insensitive in part. Furthermore, while turbine temperature and R. P. M. are the principal factors to be controlled from the standpoint of protection of the turbine, propeller thrust is a factor of great importance to the pilot and the control of R. P. M. and temperature should be accomplished in such a way that material momentary surges or "dips" of thrust are avoided. A change in turbine R. P. M. requires a large change in the kinetic energy of the rotor assembly which must be supplied by changes in turbine fuel flow, or aircraft kinetic energy or both. In a blade angle control of R. P. M., an R. P. M. change is instigated by changing the turbine load by varying the propeller pitch in a direction such that the incremental torque change is opposite in sense to the incremental R. P. M. change; for instance to increase R. P. M. the propeller pitch must be decreased which in turn decreases torque and thrust and decreases the aircraft kinetic energy. Since a demand for more R. P. M. is ordinarily associated with a demand for more torque, a control of this type is undesirable. On the other hand a fuel flow type governor acts directly to control the torque output of the turbine so that there is no primary effect on thrust and the small thrust change that does occur is in the proper sense. Although the increase in R. P. M. is accompanied by a transient increase in turbine temperature, this is not usually objectionable since the temperature is ordinarily relatively low when R. P. M. is below its maximum value.

As indicated in the diagram of Fig. 3, the coordinated control of this invention includes a temperature corrected computer output representing maximum available torque, and this output is modified by the desired percentage of torque selected by the power lever of the control quadrant which is used in conjunction with the turbine torque actually developed for effecting propeller pitch change. The condition lever of the control quadrant is operated in a manner hereinafter described to insure proper coordination of torque, fuel valve position, R. P. M. and propeller pitch for various conditions, such as starting and stopping, ground idle, cruising, and emergency conditions such as combat and landing maneuvers requiring standby full power at maximum R. P. M.

As previously pointed out, the relationship between turbine shaft torque and tailpipe temperature is approximately linear. However, for changing flight conditions the slope and the axis intercepts of the characteristic curves vary so radically that the torque obtainable at maximum turbine temperature varies over a range of approximately 4 to 1, as graphically shown by Fig. 14. The favorable condition illustrated for high torque is represented by sea level altitude and −60° F. ambient temperature and the unfavorable condition is represented by about 35,000 feet altitude and −60° F. ambient temperature, the air speed factor being similar in both cases. In conventional operation it would therefore be necessary for the pilot either to limit the range of the torque control lever to the power obtainable under the least favorable flight conditions or to keep constant watch of the turbine temperature in order to avoid operation at dangerous overtemperatures under more favorable flight conditions. Accordingly it will be seen that the operating range of the torque or power lever must fit the current flight condition so that the actual power range obtained by the power lever is compressed or expanded as required in order to obtain high operating efficiency and optimum turbine performance. The power lever will thus have an approximately linear calibration in terms of the desired percentage of currently available power.

To this end, electrical quantities are derived to represent the variable flight conditions for input to electrical computing apparatus, the output of which represents the torque which would be obtained at maximum permissible temperature and R. P. M. for the current flight condition. This output is proportioned according to operation of the pilot's power lever for selecting the percentage of power desired for the maneuver at hand and the resulting electrical quantity is used for controlling the propeller pitch and hence the shaft torque.

*Torque computer*

The torque available at maximum R. P. M. and predetermined maximum turbine temperature within the range of ambient temperature and pressure conditions and airspeeds commonly encountered in flight can be expressed by the following empirical formula:

$$Q_{sc} = \frac{K_1 P_0 (K_4 - T_a) + K_2 (P_0 - P_a)(T_a - K_5)}{1 - K_3 (K_6 - T_a)}$$

(Equation 1)

where $Q_{sc}$ = computed maximum available shaft torque (lb. ft.)
$P_0$ = ram absolute pressure (p. s. i.)
$P_a$ = ambient absolute pressure (p. s. i.)
$T_a$ = ambient absolute temperature (°Rankine)
$K_1$, $K_2$, $K_3$, $K_4$, $K_5$ and $K_6$ are constants depending on the turbine characteristics.

The electrical torque computer in one embodiment of the present invention shown essentially in Fig. 4 utilizes a servo and potentiometer system including pressure responsive devices for deriving control potentials representing $P_0$ and $(P_0 - P_a)$ and temperature responsive devices for deriving other control potentials representing $T_a$ and a correction turbine temperature, the maximum permissible turbine temperature being set by way of example at 1250° F. This computer, which is operatively related to the turbo-propeller control system as hereinafter described, functions according to the above formula to make available the maximum permissible torque over the complete range of flight conditions.

Referring particularly to Fig. 4, a signal voltage is derived according to the ambient temperature $T_a$ by means of a "Wheatstone" type resistance bridge 40 including in one leg thereof a resistance element 41 having a suitable resistance-temperature characteristic. This element represents the $T_a$ pickup and may be in the form of a flush mounting resistor bulb installed at any suitable point in the aircraft wing or fuselage where a free air stream exists. The $T_a$ pickup unit is indicated for example on the wing at 20 in Fig. 1. The bridge 40 is energized from an alternating current source $E_{ac}$ through a transformer 42, the resistances 43, 44 and 45 in the other legs of the bridge being proportioned in relation to the resistance 41 so that the voltage across the bridge junctions 46 and 47 is proportional to the difference between a predetermined reference temperature and the absolute ambient temperature, namely $(K_4 - T_a)$. This voltage represents the $T_a$ signal which is amplified by amplifier 48 for energizing through an output transformer 49 a pair of potentiometers 50 and 51 that are controlled according to the values of $P_0$ and $(P_0 - P_a)$ respectively. The amplified signal which is proportional to $(K_4 - T_a)$ also energizes as indicated another potentiometer of the computer hereinafter described.

The potentiometer 51 is in addition energized from the source $E_{ac}$ through transformer 52 for representing a constant factor so that the summed voltage across potentiometer 51 from both transformer sources 49 and 52 represents $(T_a - K_5)$. For the purpose of simplifying the description of operation of the computer, the various constants involved in a particular turbine control design are omitted, it being sufficient to state that the computer operates essentially according to the values of the variables $T_a$, $P_a$ and $(P_0 - P_a)$ for determining available turbine torque at maximum permissible temperature.

Suitable pressure responsive means, such as "sylphon" metallic bellows control slider contacts of the potentiometers 50 and 51 for deriving control voltages in the following manner: a voltage $e_1$ is derived from potentiometer 50 by the slider contact 53 that is mechanically connected as indicated to a pair of metallic bellows 50a and 50b so as to be operable jointly thereby. The bellows 50a is subjected to ram gage pressure from the tube 24 located in the compressor intake passage, Fig. 1, and the evacuated bellows 50b is subjected to the ambient or barometric pressure so that the additive bellows movement represents the ram absolute pressure $P_0$. Since the potentiometer 50 is energized by a voltage corresponding to $(K_4 - T_a)$, the derived voltage represents $P_0 (K_4 - T_a)$. The voltage $e_1$ so derived at contact 53 is in additive relation to the potential derived at contact 56 of potentiometer 51 by reason of a conductor 54 connecting the contact 53 and the mid-tap of a resistance 55 in parallel with potentiometer 51. This potentiometer is, as above described, energized by a voltage representing $(T_a - K_5)$. Accordingly the derived voltage $e_2$ from potentiometer 51 at the slider contact 56 which is also operable as indicated by a metallic bellows 51a subject to ram gage pressure $(P_0 - P_a)$ from the tube 24, Fig. 1 represents $$K_2 (P_0 - P_a)(T_a - K_5)$$

The voltage $(e_2 + e_1)$ is further combined additively with voltage $e_3$ which may be phased in either direction as required and which voltage is derived from the operation of a tailpipe temperature correction potentiometer 57 that is energized from the source $E_{ac}$ through a transformer 58. A conductor 59 connects the contact 56 of potentiometer 51 with a mid-tap of resistance 60 in parallel with potentiometer 57 so that any corrective action from the tailpipe temperature measuring equipment and motor hereinafter more fully described causes a change in voltage $e_3$. This control is of the integral type so that the position of slider 61 and consequently voltage $e_3$ bears no fixed relationship to existing turbine temperature. Its speed of correction is, however, related to temperature error.

Accordingly, the total corrected voltage can be represented by $e_1 + e_2 \pm e_3$, namely, $$K_1 P_0 (K_4 - T_a) + K_2 (P_0 - P_a) T_a - K_5) \pm e_3$$

which corresponds to the numerator of Equation 1 after temperature correction. This summed voltage is amplified by the amplifier 62 to a voltage indicated as $e_4$ which is impressed across a portion 63a of a potentiometer 63. A zero reference terminal 65 of potentiometer 50 is connected by conductor 64 to the zero power terminal 66 of potentiometer 63 and the opposite or maximum power terminal is connected to the output of amplifier 62 by conductor 67, contacts 68a and 69 of a discriminator relay DR and conductor 70. For deriving a proportionate voltage from this potentiometer to permit selection by the pilot of the desired percentage of maximum permissible torque, the slider contact 71 is mechanically connected as indicated at 72 to the power lever 9 so that the derived voltage $e_5$ is zero at the zero power setting at terminal 66 and increases toward maximum as the power lever is moved forward to increased power, i. e. toward the left as viewed in Fig. 4.

As above noted, the computed torque voltage $e_4$ represents the numerator of Equation 1. The value of denominator is represented by the voltage $e_6$ that is impressed across a portion 73a of the potentiometer 73. This voltage is obtained from two sources, namely an alternating current source $E_{ac}$ and the $T_a$ signal source, the electrical connections to the latter source, i. e. the output of the $T_a$ amplifier 48, being indicated for simplicity by a broken line 74. The $T_a$ signal voltage which represents $(K_4-T_a)$ energizes the primary of a transformer 75 with a voltage ratio $K_3$ and the voltage $E_{ac}$ which represents $$1+K_3K_4-K_3K_6$$

energizes primary of a transformer 76, the secondary windings of the transformers being connected in series and in opposing phase relation so that the resultant voltage $e_6$ impressed across the potentiometer resistance 73a represents $$[1-K_3(K_6-T_a)]$$

i. e. the denominator of Equation 1. The zero reference point 66 of the torque potentiometer 63 and the zero reference point 77 of the pitch control or reference potentiometer 73 are interconnected by a conductor 78 as indicated, and the potentiometer portion 73a is connected to its energizing source to function independently of the other parts of potentiometer 73. The reference point 77 also constitutes the low voltage terminal of potentiometer 73a.

Assuming now that the power lever 9 is set as indicated for, say 50% of the available positive torque (as distinguished from negative torque for producing reverse thrust), the derived voltage $E_5$ represents 50% of the numerator value of Equation 1.

For the purpose of adjusting the value of the denominator voltage $e_6$ so that the equation is satisfied, a servo-controlled slider contact 80 is operable automatically to derive a voltage $e_7$ from potentiometer 73 equal to the voltage $e_5$. The amount of the mechanical displacement required to produce this voltage balance corresponds to the number of ft.-lbs. of torque called for, i. e. to the right hand side of Equation 1 multiplied by the power lever setting, in this instance 50%. This follows by reason of the following relationships which have been established. By inspection $$e_5=e_4F \qquad (2)$$

where $F$=fractional power lever setting $$\left(\frac{\%}{100}\right)$$

As previously established $$e_4=K_1P_0(K_4-T_a)+K_2(P_0-P_a)(T_a-K_5)\pm e_3 \qquad (3)$$

By servo action $$e_5=e_7 \qquad (4)$$

By inspection $$e_7=e_6\frac{x}{x_0} \qquad (5)$$

where $x$=physical displacement in length units of contact 80 from point 77
$x_0$=total length of the potentiometer part 73a As previously established $$e_6=1-K_3(K_6-T_a) \qquad (6)$$

Substituting successively Equations 6 in 5 in 4 in 2

$$[1-K_3(K_6-T_a)]\frac{x}{x_0}=e_4F \qquad (7)$$

Substituting Equation 3 in Equation 7

$$[1-K_3(K_6-T_a)]\frac{x}{x_0}=$$
$$[K_1P_0(K_4-T_a)+K_2(P_0-P_a)(T_a-K_5)\pm e_3]F$$
$$x=x_0\frac{[K_1P_0(K_4-T_a)+K_2(P_0-P_a)(T_a-K_5)\pm e_3]}{1-K_3(K_6-T_a)}F$$
$$(8)$$

Equation 8 is thus seen to be proportional to Equation 1 multiplied by the desired fraction of full torque except for the addition in the numerator of a term containing the voltage $e_3$. When the output of the computer proper without overriding temperature correction represents accurately the actual torque available, $e_3$ is zero and Equation 1 is exactly fulfilled.

The servo-mechanism which equates voltage $e_7$ to voltage $e_5$ may comprise a suitable follow-up device including a reversible two-phase servo-motor 81 mechanically connected as indicated at 82 to the slider 80 for operating the same in either direction, Figs. 4 and 5. One phase winding 83 of the motor is energized from the reference source $E_{ac}$, the winding circuit also including a condenser 84 for phase shifting purposes according to well-known practice. The other phase or control winding 85 is energized from the output of amplifier 86, the input of which is connected by conductor 87 to the slider contact 80. As above indicated, the potentiometer connections are arranged so that the voltages $e_5$ and $e_7$ are in the same phase relation to each other. The net voltage appearing between the input connection 87 of the amplifier 86 and ground is the difference of voltages $e_5$ and $e_7$ by virtue of their series connection through conductors 87, 78 and 90 and contact 88d to the grounded movable contact 88 of the condition lever (assuming that for the 50% power condition in question the condition lever is set at the "normal operation" position). The servo-motor 81 is polarized so as to move the slider 80 in a direction to decrease this net voltage so that when the voltage is reduced to zero, the motor is de-energized and the position of slider 80 represents by virtue of the relationships shown in Equation 8, the computed torque.

*Propeller pitch control*

The function of servo-motor 81 in addition to positioning the balancing slider contact 80 is to effect propeller pitch control. According to the present invention, change in propeller pitch is primarily to satisfy the torque requirements, and to this end the torque called for as indicated by operation of servo-motor 81 is compared with the actual torque produced by the turbine to produce a differential control quantity that can be used directly for controlling the pitch changing mechanism of the propeller.

Referring particularly to Figs. 5 to 8 inclusive, there is disclosed a differential mechanism suitable for controlling propeller pitch in the above manner. Referring first to the simplified layout of Fig. 8, the servo-motor 81 is connected through a pinion gear 91 to the ring gear 92 of a differential 93, one sun gear 94 of which is connected through a pinion 95 and rack 96 to a pressure responsive device 97. This device may comprise a spring biased piston 98 connected to the rack 96 and mounted within a cylinder 99 that has a fluid connection 100 with the turbine torque meter (not shown). Variations in turbine torque cause through the torquemeter corresponding hydraulic pressure changes in the cylinder 99 to operate the piston, rack and sun gear 94 of the differential 93 accordingly. The differential includes the planet gears 92a and 92b arranged in conventional manner on the ring gear for interconnecting the sun gears.

The other sun gear 101 is connected directly by shaft 102 to a sun gear 103 of a second differential 104, the ring gear 105 of which is normally held in fixed position by a gear sector 106 that is biased against a fixed stop 107 by a preloading spring 108, Fig. 7. Thus with the ring gear stationary, differential 104 serves merely to transmit motion. The function of the gear sector 106 will be described later since it comes into play only when the pitch is reduced to below zero or "flat" pitch or to negative pitch.

Accordingly for normal operation when the system is under torque control the differential 93 only, functions as such and the sun gear 103 of differential 104 drives the other sun gear 109 at the same rate as the output of differential 93 through the planet gears 105a and 105b connected to the ring gear. The sun gear 109 is connected by a flexible shaft 33 to a pitch change control device 35, Fig. 1, of the propeller pitch changing mechanism. Known means such as electrical, hydraulic or mechanical systems for controlling the rate of propeller pitch change can be used in combination with the aforesaid control device 35 for increasing or decreasing the blade pitch angle at a variable rate according to whether increased or decreased torque is called for. Copending applications of Cushman, Serial No. 771,022 filed August 28, 1947; Mergen et al., Serial No. 34,984 filed June 24, 1948; and Tiedeman et al., Serial No. 776,956 filed September 30, 1947, now U. S. Patent No. 2,620,887, issued December 9, 1952, all show propellers embodying a rate of pitch change control appropriate for use in a control system of the type herein disclosed. These applications are in addition to the previously mentioned Mergen et al. application Serial No. 143,636 filed February 11, 1950.

It will therefore be seen from Fig. 8 that the differential 93 functions to compare the torque called for by the servo-motor 81 and the currently existing turbine torque indicated by the torquemeter device 97 so that the desired torque correction, either positive or negative, is represented by rotation of the sun gear 101 and corresponding rotation of the pitch rate control shaft 33. As the turbine torque changes in the direction of the indicated correction, the torquemeter pressure acting through piston 98 tends to adjust the differential 93 (and shaft 33) in a direction to neutralize the device 35 (which has previously been moved by servo-motor 81) and thus reduce the rate of pitch change as the turbine torque approaches the desired torque. The extent and sense of the rotation of the shaft 33 therefore normally is a measure of the rate and sense of change of propeller pitch required to adjust the turbine torque so that it approaches the torque called for in a manner that when combined with a properly designed governor minimizes overshooting or "hunting."

The above described operation of the computer and control system is limited to a normal cruising condition, referred to on the condition scale, Fig. 2, as "normal operation," wherein no emergency conditions are ordinarily involved, and wherein the pilot obtains complete turbo-propeller control by merely moving the power lever 9 to the power setting desired. During this operation the turbine speed may be varied according to a certain schedule which coordinates power and R. P. M. for example by governor apparatus, Figs. 5 and 10, arranged to control the turbine fuel supply. The maintenance of maximum R. P. M. for a given permissible tailpipe temperature is essential for efficient operation since decrease of turbine R. P. M. rapidly reduced the power output for a given tailpipe temperature. In the present invention no R. P. M. bias of the computer is required since with the particular schedule of power and R. P. M. employed the coordinated control insures that maximum permissible torque (temperature) is never exceeded.

The $T_a$ signal amplifier 48 and the computer amplifier 62 of Fig. 4 are the only ones in which the gain affects the output of the computer. These amplifiers therefore include large amounts of inverse feed-back so that their gain becomes substantially independent of tube characteristics according to established practice.

The special conditions requiring "feathering" (essentially 90° pitch), "flat" pitch (essentially 0° pitch) and reverse pitch are represented by settings of the condition lever 10. For example, when the pilot wishes to feather a propeller of a multiple-engine aircraft during flight because of engine trouble, the condition lever for the engine in question is moved to "cut-off," thereby impressing full torque voltage (computed) across the balancing circuit and cutting off the fuel supply by closing fuel valve 16 to cause the blade control mechanism to run toward "feather." Specifically, when the grounded condition-lever contact 88 is moved to engage the contact 88a at the cut-off position, the power lever contact 71 connected to condition contacts 88d and 88e is disconnected from the circuit and the full torque voltage $e_6$ of potentiometer 73a is impressed by way of conductor 118a and common ground across the balancing circuit including the servo amplifier 86 and motor 81. Since the balancing slider 80 is presumably in an intermediate torque position, the full torque voltage $e_6$ is greater than the balancing potentiometer voltage $e_7$ and the difference voltage energizes the servomotor 81 to move the slider contact 80 toward the left, or maximum torque position where the voltage difference in the balancing circuit is reduced to zero and the motor deenergized. Since, with the fuel now cut off, no energy is supplied by the turbine to sustain torque and R. P. M., the turbine decelerates, causing the torque measured by the torquemeter to decrease, and thereby instituting an "increase pitch" signal through differentials 93 and 104 and rate control shaft 33. This operation results in maximum permissible decelerating torque being applied to the turbine, and propeller feathering is thus accomplished in the minimum permissible time. When the feather angle is reached, pitch change ceases by reason of the action of a mechanical stop in the propeller set for the correct angle. To summarize; when the blade pitch is positive the differential 104, Fig. 8, functions merely to transmit to the β rate control shaft 33 the pitch correction indicated by the output of differential 93 (shaft 102) jointly controlled by the servomotor 81 and torquemotor pressure, and the differential output represents the rate of pitch change required. The feather control is therefore directly controlled according to the voltage $e_6$ representing 100% torque. Since the application of full torque called for by servomotor 81 with fuel cut off results in full torque being sustained by increasing propeller pitch, it will be apparent that the blade is changed to feather at the maximum rate permissible.

It is essential that the propeller be adjusted to a minimum torque angle during starting to keep starter torque requirements to a minimum. It is also necessary to adjust the propeller to essentially the zero thrust angle during ground idling, and during "normal operation" and "take-off and landing" when the power lever is at the zero power position. This angle is fortunately essentially the same as the minimum or zero torque angle. It is further required that the control be safeguarded from inadvertently running the propeller to reverse pitch during taxiing or ground idling operations when the control calls for zero torque and there is no blade pitch at which zero torque can be obtained (see Fig. 13).

According to the invention in its present form the propeller is adjusted to flat pitch when the condition lever is set at "start" and "ground idle." However, at "start" with no shaft rotation the shaft torque and the computed torque voltage are both zero and therefore if the engine was stopped with the blade feathered no "decrease pitch" signal is available immediately for bringing the propeller to flat pitch. For the purpose of providing a decrease pitch signal, the condition lever at "start" provides a signal equivalent to calling for a small amount of negative power. This part of the control functions as follows: when the condition lever contact 88 is at either the "start" or "ground idle" setting, the servo amplifier 86 is connected through the common ground and conductor 131 to a tap 131a on a potentiometer section 73b of the balancing potentiometer 73 defined by terminals 77 and 73c. This potentiometer section 73b is energized from the A. C. reference source $E_{ac}$ through a transformer 79 and its voltage has opposite phase relation with respect to terminal 77 to the voltage across potentiometer section 73a. Therefore, the voltage tap 131a on the potentiometer 73b could be considered as representing a small negative torque, such as 2% for example of the total potentiometer voltage, for providing a signal for decreasing propeller pitch. Accordingly the servomotor 81 runs the differential control in the direction of decreasing pitch.

Pitch over-ride control

It will be noted, referring to the propeller characteristic curves of Fig. 13, that it is impossible at sea level standstill conditions to maintain rated R. P. M. of the propeller at less than some definite value of shaft torque and consequently when zero or less than this amount of torque is called for, the propeller control unless compensated tends to reverse the blade angle to full reverse in an attempt to satisfy the zero torque signal. That is, unless the pitch control by torque is overridden, the positive torque signal from the torquemeter in combination with a zero or a negative torque signal from the servomotor 81 would tend to make the blade angle negative. This in turn would further increase the torquemeter pressure with the result that control is lost and the propeller is rapidly operated to a position of full reverse pitch.

The control for adjusting the blade to flat pitch without overshoot functions in the following manner taking for illustration, the ground starting condition: the pitch is reduced from feather (assuming that the engine was previously stopped with the propeller feathered) to flat pitch as the servomotor 81 moves the slider 80 toward the balance position at tap 131a. At the point of zero pitch an override mechanism comes into play to hold the propeller at substantially flat pitch. This over-ride mechanism involves "blade angle follow up" control as distinguished from the previously described torque control and is specifically illustrated by Fig. 7 taken in connection with Figs. 5 and 8. The pitch indicating device 34, Fig. 1, is as previously stated connected through a flexible cable 32 to operate the gear sector 106, Fig. 7. A shaft 32b which constitutes an extension of cable 32 has mounted thereon the gear sector 106 having a hub 106a which is free to rotate on the shaft 32b. A pitch index finger 110 that is positioned by the shaft is adjustably connected thereto by means of a vernier adjusting device 111 including a collar 111a secured to the shaft and an adjustable collar 111b that is rotatable on the shaft. The index finger 110 is secured to the collar 111b, and this collar is secured with respect to collar 111a by means of an intermediate vernier collar 111c also rotatable on the shaft. The three collars are suitably clamped together by means on the shaft and are in toothed engagement as indicated, the vernier collar 111c having for example 29 teeth at one side for engaging a similar number of teeth on collar 111a and 30 teeth at the other side for engaging a similar number of teeth on collar 111b thereby providing in well known manner a fine adjustment of the index finger 110 with respect to the shaft. The adjustment may be such that at zero pitch the finger 110 just touches the offset pin 106b carried by the gear sector 106, and is out of engagement with the pin at all values of positive pitch.

Accordingly when the blade pitch is indicated as less than zero, the index 110 engaging the pin 106b has rotated the gear sector 106 and hence the ring gear 105 of the differential 104 a corresponding amount. The differential 104 now functions as such and the differential 93 serves merely to transmit motion from the servomotor 81 since the torquemeter is by-passed substantially at and below zero pitch as presently explained. Normally when the blade angle is positive and the system is under torque control, referring now to Figs. 7 and 8, the differential 104 serves merely as part of the transmission shaft while the differential 93 is jointly controlled by the servomotor and torquemeter to produce a differential rate control quantity. When however the gear sector 106 is rotated in response to a reverse pitch indication of shaft 32, the arrangement is such that the ring gear 105 of differential 104 is rotated in a direction to counterbalance or neutralize the previous decrease pitch signal from shaft 102 and to close the rate control mechanism 35 so that the blade remains at a slight negative angle, i. e. substantially flat pitch. In other words, a negative departure of pitch angle from zero causes the differential 104 to offset the "decrease pitch" movement of shaft 102 so that the propeller control represented by the output shaft 33 is stabilized at the small negative blade angle indicated by the position of balancing slider 80, i. e. at the essentially minimum torque position represented by voltage tap 131a of the balancing potentiometer 73b.

In order to substitute blade angle control for torque control when the blade angle is decreased below flat pitch, the torquemeter indication at differential 93 is eliminated so that the position of servomotor 81 indicates the blade angle desired. To this end, a bypass or dump valve 132, Fig. 8, is provided for returning the torquemeter oil to the sump. The dump valve 132 is related to a cam 133 controlled by the pitch indicator shaft 32b and is actuated by the pitch indicator cam when the pitch angle becomes less than zero thus preventing the build-up of oil pressure and consequent deflection of the torquemeter piston 98. Accordingly, the piston spring returns the rack 96 to its initial position where it, together with sun gear 94 is held stationary. In the specific arrangement shown in Figs. 5 and 6, the cam 133 has an elongated slot 133a arranged eccentrically with respect to the shaft 32b and the plunger 134 of the dump valve is provided with a follower-roller 134a that rides in the cam slot. The cam 133 is adjustably secured in a suitable manner to the shaft 32b, such as for example by a vernier device 133c similar to that described and shown in Fig. 7 whereby the cam can be precisely adjusted for operating the dump valve with respect to zero pitch.

Reverse pitch under power is possible only at the "take-off" and "landing" setting of the condition lever. This setting is always used for example during landing maneuvers since full reverse thrust under full power may be rapidly required for quick braking. In this position the condition lever contact 119 which is connected by conductor 119a to the negative side of the power lever potentiometer 63, engages a fixed contact 119b connected by conductor 119c to the terminal 73c of the balancing potentiometer 73b. Therefore in the "take-off and landing" position the potentiometer 63b which in this case may be calibrated according to negative blade angle is energized directly by a fixed voltage from the balancing potentiometer 73b representing a negative blade angle limit. Thus in this condition lever position the power lever may be used throughout the entire power range for torque control in the case of forward thrust, and for blade angle ($\beta$) control in the case of reverse thrust.

Since the power lever slider 71 is now connected (through condition lever contact 88) in the balancing circuit, the servomotor 81 is effective to position the balancing slider 80, and hence the pitch controlling differential apparatus according to the position of the power lever on the $\beta$ potentiometer 63b thereby providing reverse thrust control for the aircraft throughout the full reverse pitch range of the propeller. During reverse pitch operation when the system is under blade angle control, the pitch angle is a direct function of the power lever setting by reason of the follow-up action of the differential mechanism above described. That is, as the servo- motor 81 moves slider 80 in the direction of reverse pitch beyond the minimum torque position to a position corresponding to the negative blade angle setting of the power lever, the propeller control becomes one of the blade angle follow-up type wherein the blade angle is a function of the setting of servomotor 81. This is because the torquemeter is ineffective throughout reverse pitch control and the pitch indicator control of differential 104 tends to close the rate mechanism 35 so as to reduce the rate of pitch change called for by the servomotor 81 as the actual pitch approaches the pitch called for by the power lever setting on $\beta$ potentiometer 63b. As the blade angle is decreased below flat pitch, the propeller shaft torque becomes positive and eventually increases under certain flight conditions to the full rating of the power plant, thereby providing maximum reverse thrust for braking. The full reverse pitch stop in the propeller is so chosen that under no condition is the maximum rating of the power plant exceeded.

*Torque over-ride control*

As previously indicated in connection with Fig. 14, it is possible under certain flight conditions to obtain turbine torques considerably in excess of the rating of the power plant before the maximum permissible tailpipe or turbine temperature is reached and it is therefore necessary to have a maximum torque limiting device so that the maximum torque which the turbine reduction gearing system can safely withstand will not be exceeded.

Normally the corrected and amplified computed torque voltage from amplifier 62 energizes the power potentiometer 63a through the discriminator relay DR. The function of relay DR is to switch the power potentiometer 63a from the computer amplifier 62 under conditions where abnormally high torque could be obtained to a reference source of potential, i. e. the potentiometer portion 73a energized by voltage $e_6$ (the denominator value of Equation 1) representing maximum permissible torque, thereby overriding or taking the control away from the computer.

For this purpose the relay DR comprises a pair of movable contacts 68a and 68b (contact 68b shown inactive in Fig. 4) gang-operated as indicated and spring biased to one position and operated by the relay coil 68c to the other position, these contact positions corresponding to the normal and over-riding control respectively. The coil 68c is energized from a discriminator circuit 112 that functions to compare the computed torque value with a permissible or reference torque value. The input to the discriminator circuit 112 represents the positive or negative difference between the aforesaid torque reference voltage $e_6$ and the computed torque voltage, i. e. the output of amplifier 62. The voltage $e_6$ although variable in magnitude between wide limits as flight conditions change always corresponds to maximum permissible torque. Specifically, the input of a conventional summing amplifier 113 is connected by conductor 114 to the output of the computer amplifier 62, and by conductor 115 to the high voltage terminal of reference potentiometer 73a, so that in effect the voltages across potentiometers 63a and 73a are compared at the amplifier. The resultant amplified output energizes the discriminator circuit through transformer 116.

The discriminator circuit per se can be of any suitable design capable of sensing a positive or negative difference of computed torque voltage with respect to the reference voltage for energizing the DR relay coil accordingly. In the arrangement shown, the relay coil is energized only when an over-ride condition obtains. If, for example, the computed torque voltage does not exceed the reference voltage, the coil 68c is deenergized and contacts 68a and 69 are spring biased to close as shown for connecting the computer to the control system. If on the other hand the computed torque voltage exceeds the reference voltage, the relay coil is energized to operate contact 68a in the opposite direction to engage contact 117 and transfer the control from the computer to the reference torque potentiometer 73a. The power setting potentiometer 63a is now directly connected to the $e_6$ reference voltage source by conductor 67, relay contacts 68a and 117 and conductors 118 and 115 so that the percentage of torque called for (voltage $e_5$) by the power lever setting is within safe limits of turbine capacity.

Briefly, the discriminator circuit 112 functions to produce a D. C. voltage output that is proportional in polarity and magnitude to the phase and magnitude of the alternating current input signal. The secondary coils 120 and 121 of the transformer 116 are connected to the control grids 122 and 123 of thermionic tubes 124 and 125 respectively and to a common junction 126 of the tube cathodes in well-known manner. The plate circuits of the tubes are interconnected and energized from a phase reference source $E_{ac}$ through a transformer 127. A rectifier tube 128 is controlled according to the sensing operation of tubes 124 and 125 for energizing the relay coil 68c and is related thereto in the following manner: the grid of rectifier tube 128 is connected to the cathode of tube 125, and the cathode of tube 124 is connected to a negative biasing source 129. The plate circuit of rectifier tube 128 includes conductor 130, coil 68c and a D. C. plate voltage source as indicated. Accordingly, for normal operation when $e_6$ is greater than $e_4$, that is, when torque computed is within permissible limits, the grid and plate of tube 124 are concurrently positive so that this tube is conductive, and tube 125 is non-conductive by reason of its out-of-phase grid voltage. This conducting action of tube 124 increases the potential drop across the cathode resistance so that the resulting lower potential at junction 126 together with the negative bias 129 places a strong negative bias on the grid of rectifier tube 128. Therefore for this condition the rectifier tube does not conduct and the relay coil is deenergized.

On the other hand when $e_4$ is greater than $e_6$, that is when computed torque is greater than the permissible maximum torque of 14,000 lb.-ft. for example, the tube 124 is cut off and the tube 125 is made conducting with the result that the positive potential at the cathode of tube 125 overcomes the negative bias 129 and makes positive the grid of the rectifier tube. This tube therefore becomes conducting so that the relay coil 68c is energized to operate the relay DR to the over-ride position.

The circuit details are so selected that relay pick-up and drop-out do not occur so close together with respect to the difference between the computed and constant-torque-desired signals as to cause instability, or shifting back and forth of alternate control signal source in the region where the difference between these two signal voltages is small.

In summary: when the flight conditions are favorable for developing high turbine torque as graphically shown by Fig. 14, the output voltage of the computer, if larger than the reference torque voltage, causes the discriminator device to over-ride the computer thus protecting the turbine from the effects of excess developed torque. Since the over-riding control operates independently of the position of the power lever, it will be apparent that excess torque in the high-power range can be anticipated when the power lever is set for low-power demands.

Operation of the power lever selects a certain percentage of torque, either of computed available torque as in normal operation or of maximum allowed torque as where the computer is over-ridden. It should be noted that the voltage derived from power potentiometer 63a simply represents a desired percentage times the computed available torque (although the actual voltage corresponding to a given percentage of maximum currently available torque is a variable), whereas whatever voltage happens to be impressed across the reference torque potentiometer 73a represents the maximum allowed torque in lb.-ft. due to the gear limit. Accordingly in the over-ride position, the power lever is actually selecting the desired fraction of a definite amount of torque in lb.-ft.

Temperature correction control

Although the operation of the computer is reasonably accurate in that in general an equation may be heuristically determined as in the example heretofore cited which will establish a close co-relation between the computed torque and the actual currently available turbine torque, it is considered good practice to incorporate a correcting or over-riding control based on actual measured turbine temperature which acts when necessary to correct the indications of the computer so that maximum permissible turbine temperature is always obtainable and is never exceeded except during brief transient periods. An over-riding control of this character will therefore function to compensate for anticipated aging of the turbine whereby, because of erosion or dust collection on the compressor blades or other causes, the power available from the turbine is reduced as engine time accumulates. This control also provides a limited amount of protection against sudden malfunctioning of the power plant such as that which might be due to battle damage. The action of the temperature over-ride is such that at the full power setting of the power lever where maximum performance is desired, the output of the computer is increased or decreased as necessary to obtain maximum permissible turbine tailpipe or burner temperature.

The turbine temperature responsive means and the temperature over-ride control associated therewith are illustrated in Figs. 4 and 9 taken together. As previously stated, the temperature correction potentiometer 57 of Fig. 4 is adjusted by the tailpipe temperature motor, the control of which is shown in Fig. 9, so as to add to or subtract from the computed torque when the tailpipe temperature falls below or exceeds the pre-set temperature for example 1250° F. For example, if the tailpipe temperature is indicated as excessive, the amount of computed torque is decreased so that less torque is called for. Hence the turbine temperature tends to decrease. Conversely, if the tailpipe temperature is indicated as lower than the permissible amount, and if the pilot is calling for maximum torque, the computed torque is increased so that the maximum permissible torque is available. The control functions so that the temperature over-ride subtracts from the indication of the computer at all power lever positions, thereby controlling over-temperature in the event of malfunctioning of the power plant.

The control of the tailpipe temperature motor for adjusting the temperature correction potentiometer 57 of Fig. 4 is illustrated by Fig. 9 wherein four tailpipe thermocouples 135 of suitable time response characteristic are connected in parallel-series arrangement to constitute the turbine temperature pick-up. This arrangement provides an averaged value of tailpipe (or burner) temperature as well as increased voltage output, and increased safety factor in case of failure of a thermocouple. The D. C. thermocouple potential is converted into an A. C. signal by means of a saturable reactor circuit 136 which includes cold junction compensation. The A. C. signal obtained is in turn amplified for operating the reversible tailpipe temperature motor 137 through a range corresponding to the time integral of the temperature departure from the pre-set value. This motor in turn corrects the computed torque voltage, Fig. 4, so as to vary the turbine torque and hence through action of the governor which regulates fuel flow, the tailpipe temperature. When reduction or increase of turbine temperature is called for, the thermocouple signal tends to cause the tailpipe temperature motor 137 to rotate in a corresponding direction for temperature correction at potentiometer 57 until the desired temperature is reached when the motor is deenergized.

Referring specifically to Fig. 9, the tailpipe thermocouples 135 are terminated in a junction box 138 that is located as close as possible to the thermocouples but at a location where the ambient temperature is not excessively high. Since the thermocouple voltage signal is proportional to the temperature difference between the tailpipe and cold junction, it is necessary to compensate for the variation in generated voltage due to variation in ambient temperature. To this end a temperature responsive resistor 139 is located in the junction box and is connected in the circuit so that the voltage variations across it substantially balance out the ambient temperature voltage component in the thermocouple output voltage.

The tailpipe temperature is compared with a standard or reference temperature in the following manner: a D. C. voltage corresponding to maximum permissible temperature, i. e. the pre-set temperature value, is developed across a resistance 140. This voltage may be obtained from an A. C. source and is rectified and maintained constant by a rectifier and voltage regulating device generally indicated at 141. For compensating variation in the voltage regulator output due to changing tubes, an adjustable potentiometer 142 is connected in the regulator output so as to maintain at terminal 143 a constant voltage of, say +104 volts D. C. where the nominal voltage supplied from regulator 141 is slightly higher, say 105 volts D. C. The constant voltage junction 143 is connected to a plurality of voltage dividing circuits arranged in parallel, one circuit comprising a voltage divider having a high resistance 144 connected in series with the comparatively low cold-junction compensation resistance 139 which is in turn connected to ground so that the voltage drop across resistance 139 is but a small fraction of a volt. Conductor 144a may thus be considered as a constant current source. As above indicated, the resistance 139 varies with ambient temperature, the resistor having a positive temperature coefficient of resistance. Under conditions where no current flows through the thermocouple circuit, the voltage across resistor 139 is proportional to its resistance, thus providing the desired cold junction compensation. A second parallel circuit connected between junction 143 and ground includes series-connected resistances 145 and 140 proportioned so that a very small voltage is developed across the reference voltage resistance 140. Since the voltage at junction 143 remains constant and since the resistances 145 and 140 are fixed, the reference voltage across resistance 140 remains fixed at the value representing the reference tailpipe or burner temperature, e. g. 1250° F.

The thermocouples 135, compensating resistance 139 and reference resistance 140 are all connected in series with a pair of signal coils 146 and 147 of a pair of saturable reactors 148 and 149 respectivey of the sensing circuit 136, the various potentials being so related that for the pre-set temperature condition the compensated thermocouple voltage exactly balances the reference voltage so that no current flows and the signal coils 146 and 147 are deenergized. Variation of thermocouple voltage so as to create an unbalance, either positive or negative with respect to the reference voltage across resistance 140 results in corresponding energization of the aforesaid signal coils. Each saturable reactor includes in addition to a D. C. signal coil, an A. C. coil and a flux biasing coil that functions as a flux reference. The biasing coil 150 of reactor 148 and the biasing coil 151 of reactor 149 are connected in series in a circuit that is energized from the constant voltage junction 143. The circuit includes a relatively high resistance 152 and is grounded so that the D. C. energization of the biasing or flux reference coils is constant at all times.

The signal coils 146 and 147 are connected in opposition to each other and are related to the respective biasing coils so that for a given D. C. signal current the flux of one signal coil adds to the bias flux of its associated biasing coil whereas the flux of the other signal coil opposes or subtracts from the flux of the respective biasing coil. The reactors are designed so that normally when the signal coils are deenergized, i. e. when the pre-set temperature obtains, each reactor core is partially and equally saturated. Accordingly energization of the signal coils produces varying degrees of saturation in the reactors and hence, since the impedance of a reactor coil varies with the degree of saturation of the core, the impedances of the A. C. reactor coils 153 and 154 vary accordingly.

The reactor coils 153 and 154 are connected in an alternating current bridge circuit 157 that is energized from an A. C. source $E_{ac}$ and connected to a detector 155 for obtaining a phased temperature signal. The bridge includes the two series-connected reactor coils 153 and 154 as legs on one side, and the series-connected resistances 159a, 159b and 159c on the opposite side. The junction terminals 156 and 156a between the inductance and resistance sides of the bridge are connected to the source $E_{ac}$ and ground respectively, the junction 156 being connected to the A. C. source through a resistance-condenser circuit 158 for insuring application of correct voltage and phase to the bridge. The opposite junction terminals 160 and 160a are connected to an amplifying detector 155, the terminals of which are shunted by a condenser 155a. This condenser functions to tune to approximate resonance the circuit including coils 153 and 154 for the purpose of increasing sensitivity. Junction 160 is a mid-tap between the coils 153 and 154, and junction 160a is an adjustable resistance tap on the resistance 159b for initially balancing the bridge so that no voltage appears across the junction terminals 160 and 160a when the signal coils are deenergized.

The detected temperature variation signal voltage from the amplifying detector 155 is used to control the tailpipe temperature motor 137 in conventional manner. A pair of thermionic tubes 161 and 162 have their grid circuits connected in parallel to the detector as indicated, the output of the detector being connected to a common grid junction 163. The respective circuits of plates 164 and 165 are arranged to be energized from the A. C. source $E_{ac}$ through transformer 166, the secondary winding 167 of which has a center tap connected by a conductor 168 to the control winding 169 of the two-phase motor 137. A condenser 170 is connected across the motor winding 168 for conventional two-phase operation of the motor and the reference voltage winding 171 is connected through a condenser 172 and conductor 173 to the reference A. C. source $E_{ac}$.

For keeping this part of the circuit always in readiness for a decreased temperature correction, the plate 165 of tube 162 is directly connected to the transformer secondary winding 167, whereas the plate 164 of tube 161 is connected to the A. C. source in such a way that the tailpipe temperature motor can call for increased temperature only under normal control and when the power lever is at the 100% power setting. That is, an increase in tailpipe temperature is essential only when the realization of maximum power is desired, whereas the control for decreasing temperature should be in readiness at all times and at all settings of the power lever for preventing turbine damage. Accordingly, power is decreased, if because of turbine malfunctioning maximum permissible temperature is exceeded at a reduced setting of the power lever. For the above described purposes of control, the plate circuit of tube 162 is uninterrupted whereas the plate circuit of tube 161 includes in series the contacts 68b and 174 of the discriminator relay DR which are connected by conductor 175 to the power lever contacts 176 and 177. Also connected in series with contacts 68b and 174 are the normally closed contacts 236c that are opened by actuation of relay coil 236, the purpose of which is hereinafter explained. The power lever contacts are closed only at the 100% power setting as indicated for "increase temperature" control and the relay contacts 68b and 174 are closed during normal operation, i. e. when the control is connected to the computer output.

Assuming now that the thermocouples indicate excess temperature so that the thermocouple voltage exceeds the reference voltage across resistance 140, the voltage across the series-connected signal coils 146 and 147 of the saturable reactor circuit has a definite polarity, being for example negative at the upper terminal of coil 146 and positive at the lower terminal of coil 147 for the excess temperature condition assumed. In case the thermocouple voltage is below the reference voltage indicating that the tailpipe temperature can be increased, the polarity of the signal coil voltage is reversed as indicated. Depending upon its polarity the flux of a given signal coil adds to or opposes the bias flux of the associated bias coil so as to vary the impedance of the associated A. C. coil of the respective reactor. Concurrently, the other signal coil is acting in opposite fashion on the bias flux of its associated bias coil so that the impedance of one A. C. coil is increased and that of the other is decreased. This changes the balance of the A. C. bridge 157 for producing the A. C. temperature signal voltage across junctions 160 and 160a.

For the excess temperature condition above assumed, the amplified A. C. signal from detector 155 is in phase with the voltage at plate 165 of tube 162 thereby causing the tube 162 to conduct and energize the motor winding 169. The motor accordingly operates in a direction to adjust the temperature correction potentiometer 57, Fig. 4, so as to decrease the computed torque voltage and this voltage in turn controls the pitch changing mechanism for reducing the turbine torque and hence the tailpipe temperature. This reduced temperature correction is thus available at all times.

In case the power lever is set for 100% power under normal conditions and the thermocouple voltage is below the reference voltage indicating that the tailpipe temperature can be increased to the reference value for realizing maximum permissible torque, the bridge 157 of the saturable reactor circuit is unbalanced in the opposite direction and the A. C. signal voltage is displaced in phase 180° with respect to that of the previously described "decrease temperature" signal. The signal voltage at grid junction 163 is now in phase with the voltage on plate 164 so that the tube 161 becomes conducting to energize motor winding 169. Since this energizing current is dephased 180° with respect to the previous control current the motor 137 is operated in the opposite direction to adjust the temperature correction potentiometer so as to indicate increased computed torque. Therefore the turbine torque output is increased through the servomotor 81 and associated circuits, Figs. 4, 5 and 8, in the manner previously described. For obvious reasons, the tailpipe temperature motor is precluded by relay DR from making an "increase temperature" correction when an over-ride condition obtains, as for example when the ambient temperature and flight altitude are both low since the available torque is thus indicated to be already too high.

Because of the thermal lag in the thermocouples it is necessary to apply the correction comparatively slowly to avoid unstabilizing the control. Accordingly the gearing of tailpipe temperature motor 137 is such that the adjustment of the temperature correction potentiometer is at a rate producing a maximum rate of voltage change corresponding for example to approximately 5% of maximum torque per second. This maximum rate is attained when the temperature error is, say 100° F. or more.

*Governor control*

The governor apparatus and associated control circuits are shown by Figs. 5 and 10. The governor per se can be of conventional design preferably of the so-called "droop" stabilized type, and is suitably connected to the rotating element of the turbine in the usual manner. The fuel supply to the turbine is normally controlled according to the governor operation. Referring specifically to Fig. 5, the governor assembly 180 comprises a main housing 181 for the control valve spindle 182 and the fluid actuated servo system that controls the fuel valve. The flyball assembly for controlling the valve spindle is mounted within an auxiliary housing 183 mounted on the main housing 181 and in communication therewith through an opening 184 in alignment with the valve spindle. The valve spindle extends into the flyball housing and is connected at its upper end to a disc 185 that is engaged at its lower surface by the toe arms 186 of the flyballs 187. The valve spindle 182 is also connected to a dished member 188 that is engaged by the lower end of the speeder spring 189, the upper end of which engages an adjustable abutment 190. Adjustment of the compression of the speeder spring for regulating the governor is effected by means of a governor motor 191 that is connected to the abutment 190 through gear reduction means including a pinion 192 and rack 193. The fly balls 187 are pivotally connected at 194 to a bracket structure 195 that constitutes an extension of a rotatable sleeve 196 suitably mounted in the housing 181 and connected by means including a gear 197 to the turbine shaft. The sleeve 196, which is apertured as illustrated and concentrically disposed on the control valve spindle 182, therefore is rotated according to turbine speed so that the flyballs 187 which rotate with the sleeve are positioned, in case the turbine speed is increased to move the valve spindle upwardly against the tension of the speeder spring. When the turbine speed decreases the flyballs tend to collapse and the valve spindle is depressed by the speeder spring until the spring force and flyball centrifugal force balance each other. The flyball toe arms 186 rock on the lower surface of the disc 185 so that the effects of friction are minimized. It will be understood that the governor apparatus is specifically described only by way of example and that other governor mechanisms having suitable characteristics may be used in the practice of the present invention.

The governor is hydraulically controlled in response to flyball operation of the valve spindle for operating the fuel control element 198 in the following manner: the space between the two bottom lands 199 and 200 of the valve spindle is arranged to be in communication with a passage 201 connected to a source of servo oil under pressure for controlling application of servo oil pressure to the fuel servo piston 202 in conventional manner. In response to a turbine underspeed for example the speeder spring 189 pushes the valve spindle downward a certain amount so as to open the passage 203 leading to the servo cylinder 204. This passage also communicates with the buffer cylinder 205 and includes an adjustable needle valve 206. The resulting surge of oil deflects the buffer piston 205b which tends to be centered as illustrated by springs 207 and produces a pressure differential proportional to the buffer spring deflection on the compensating piston 208 that is connected to the control valve spindle. This piston is in communication with buffer cylinder 205 by passage 205a and with passage 203 by passage 203a. It is apparent that the pressure at opposite sides of the compensating piston 208 is equalized in the steady-state condition by reason of leakage of servo fluid through needle valve 206.

For the "increase-speed" signal in question the differential force above described urges the valve spindle in a direction tending to reclose the metering valve 200a. The action is such that a quantity of oil is rapidly admitted to servo cylinder 204, this quantity being proportional to the off-speed. The needle valve 206 located in the passage 203 between the buffer piston and servo-piston is adjusted so that the flow of oil through the needle valve into the servo cylinder is maintained as long as the R. P. M. error persists. As oil is admitted into the servo cylinder, the servo piston 202 compresses a restoring spring 209 so that the servo cylinder oil pressure is proportional to the servo piston oil displacement. The rate of oil flow at the needle valve is approximately proportional to the buffer spring deflection and consequently to engine off-speed. Thus, the change of position of the servo piston due to this component of oil flow is proportional to the time integral of the off-speed. Therefore since the fuel flow to the turbine is to correspond with the position of the spring restored servo piston 202, it will be noted that change in fuel flow is proportional to off-speed plus the time integral of the off-speed. This fulfills the conditions required for a "droop" stabilized governor, i. e. wherein the R. P. M. is allowed to droop slightly for a brief period following sudden torque changes.

The displacement of the servo piston constitutes the output signal of the governor and is applied in suitable manner to operate a control valve $V_a$ in the fuel line 4 as indicated in Fig. 10, or for example by controlling a conventional fuel pump displacement valve (not shown) ordinarily supplied with the turbine. For this latter case it may be the pressure inside cylinder 204 rather than the displacement of piston 202 which effects the control. The action of the fuel pump displacement control valve is such that the stroke of the fuel pump adjusts itself until fuel pressure is proportional to the governor output pressure signal, the resulting fuel flow being essentially proportional only to this pressure and independent of combustion chamber pressure.

The speed setting of the governor is controlled as above indicated by an electric servomotor, Fig. 10, that operates through gearing 192 and 193 to adjust the speeder spring 189. The gear reduction between the electric motor and speeder spring is in the present instance, designed so that about 20 seconds is required for the servomotor to displace the speeder spring through its full stroke from a setting of, for example, 8000 R. P. M. to 13,000 R. P. M. of the turbine. The reason for this slow action is as previously mentioned that large amounts of kinetic energy must be added to the rotating part of the turbine to increase its speed. Consequently the acceleration of the turbine at a rate of 250 R. P. M. per second requires a substantial increase of turbine temperature above its steady state value. It is therefore necessary to restrict the rate at which the governor speed setting can be changed so that excessive amounts of fuel are not applied by the governor due to a large speed error being suddenly introduced, such as when the condition lever is moved from the 8000 to the 13,000 R. P. M. position, i. e. from "ground idle" to "take-off and landing." However, as above indicated, maximum rate of acceleration depends on the turbine temperature "overshoot" that can be tolerated and the above data is merely explanatory.

Since in the present case the minimum setting of the governor is for 8000 R. P. M. at "start" and "ground idle," the governor will at the low R. P. M. existing during turbine starting call for maximum fuel flow. Since the fuel flow must however be carefully controlled during the starting operation, an auxiliary control in addition to the governor is required. A manually controlled fuel valve $V_m$, Fig. 3, may be used during this operation so as to be manually operated by a direct linkage connection with the fuel lever 11 in the cockpit and thus directly to control the fuel flow. This valve may also be used for stopping the turbine by shutting off the fuel as previously described in explaining control action during feathering. Obviously the governor cannot be used for this operation since if it permitted the fuel to be completely cut off the burners might be accidentally extinguished during a transient overspeed condition.

The control of the electric servomotor for adjusting the governor setting according to condition and power lever operation is illustrated by Fig. 10. The motor 191 is of the two-phase type and is connected in an automatic balancing circuit in such manner that the motor operates through a range and in a direction corresponding to the magnitude and sense of an unbalance voltage produced according to certain settings of the condition and power levers. Specifically, the balancing circuit 210 is energized from an alternating current source $E_{ac}$ through a transformer 211, a secondary winding 212 of which is connected to conductors 213 and 214 for energizing three resistance circuits 215, 216 and 217 arranged in parallel. The resistance circuit 215 is provided with voltage taps 218 and 219 that are connected to certain contacts 228c and 228e of the condition lever 10 representing two different turbine speeds for controlling the governor motor circuit in a manner presently described. The resistance circuit 216 is also arranged to be alternatively connected by the power and condition levers to the motor control circuit. This connection includes a slider contact 220 positioned by the power lever 9, conductor 220 and the contacts 228 and 228d of the condition lever which are connected to the motor control in a manner presently described. The resistance circuit 217 constitutes a balancing potentiometer having a slider contact 221 that is positioned by the motor 191 through a suitable mechanical connection indicated at 222.

The motor energizing circuit comprises a pair of windings 223 and 224, the winding 223 being energized from the reference source $E_{ac}$ and the control winding 224 being energized from a pair of thermionic tubes 225 and 226 that are in turn controlled by the unbalance voltage output of amplifier 227. This output depends on the voltage selected by the condition lever, or by the condition lever in combination with the power lever for the special case of "normal operation" wherein either full R. P. M. or predetermined lower R. P. M.'s are alternatively available.

The condition lever is connected to the slider contact 228 for engaging the associated fixed contacts corresponding to the condition lever positions as indicated, and the slider contact is connected by a conductor 229 to the input of the amplifier 227, the output of which is connected by conductor 230 to a common junction 231 of the parallel connected control grid circuits of the tubes 225 and 226. The plate circuits 232 and 233 of the respective tubes are connected to a secondary winding 234 of the transformer 211 and the winding 234 is connected at a center tap as indicated to the motor control winding 224 by conductor 235 to constitute the common return and load circuit of the tubes. The plate circuit 232 of the tube 225 which is the "increase R. P. M." circuit includes a relay coil 236 shunted by a condenser 236a. The relay coil controls a pair of contacts 236b connected in the input conductor 87 of amplifier 86, Fig 4, for the purpose of disabling during an increase of R. P. M. the power servomotor 81, and also causes the "temperature-increase" circuits of the temperature correction servomotor to be disabled by opening the circuit through contacts 236c (Fig. 9). Thus for an "increase R. P. M." condition the accompanying power increase indicated in Fig. 11 is not made until the R. P. M. change has been essentially completed, thereby permitting the transient temperature increase which accompanies an R. P. M. increase from producing an over-temperature condition.

Further description of the present type of motor control circuit which is in other respects essentially the same as that described in Fig. 9 is unnecessary, it being sufficient to state that tube 225 is made conducting for energizing the motor control winding 224 in one direction to increase the R. P. M. when the voltage impressed on the grid is in phase with reference voltage $E_{ac}$, and alternatively the tube 226 is made conducting when the grid voltage is dephased by 180° so that the motor control winding 224 is energized in the opposite direction for reversing the rotation of the motor and decreasing R. P. M.

The phase relationship of the control voltage input to amplifier 227 is determined according to the position of the slider contact 221 of potentiometer 217 relative to the voltage position selected at the branch resistance circuit 215, 216 or 218 as the case may be. Since the amplifier 227 is arranged to be included in the balancing circuit between the branch circuits and the slider 221, the amplifier input will be zero and the motor 191 will be deenergized when for example the condition setting is at "take-off and landing" and the voltage from terminal conductor 213 to the tap 219 of branch circuit 215 is equal to the voltage from conductor 213 to the potentiometer slider 221, thus balancing the circuit for the governor setting at maximum R. P. M. When however, these voltages are unequal, as when the potentiometer voltage is less than the other voltage, the phase of the unbalance input voltage to amplifier 227 has a definite relation to the phase of the reference voltage $E_{ac}$, and when the potentiometer voltage is greater than the other voltage the amplifier input voltage is dephased 180° with respect to the former input.

From the above description of the motor control and balancing circuits, it will be seen that with the motor 191 polarized so as to move the potentiometer slider 221 in a direction to decrease the voltage difference across the circuit including the amplifier 227, the servo system tends to maintain an automatic balance and to operate the governor motor 191 according to the magnitude and sense of the voltage unbalance established by operation of the condition and power levers.

*Pilot's control quadrant*

The control lever system used in the present invention follows the principle of the so-called unilever control system proposed by the Armed Forces. In the present case, turbine power and R. P. M. are both controlled primarily by a singel quadrant lever termed the "power lever" according to a predetermined schedule that varies with different flight conditions. A second control lever termed the "condition lever" has in the present form five positions for establishing particular relationships between power, R. P. M. and power lever positions for the respective conditions. These five positions, together with a tentative schedule for relating power and R. P. M. are indicated in the following table:

power lever is ineffective to change the governor setting. The R. P. M. therefore remains fixed at its maximum value throughout the entire operating range of the power lever as indicated in Fig. 12. The "take-off and landing" position represents an alert or potential emergency condition wherein the full application of power at

| Condition Lever | Torque Called for | Blade Pitch | R. P. M. Called for | Governor Fuel Valve | Manual Fuel Valve |
|---|---|---|---|---|---|
| Cut-off | +100% (Signal) | Feather | 8,000 R. P. M. | Open | Closed. |
| Start | Negative (Signal) | Flat | 8,000 R. P. M. | do | Manual Control. |
| Ground Idle | do | do | 8,000 R. P. M. | Governor Control | Open. |
| Normal Operation | Full Range Forward | Positive | 80%–100% (by power lever). | do | Do. |
| Take-off and Landing | Full Range Forward and Reverse. | Positive or Negative. | 13,000 R. P. M. (maximum). | do | Do. |

When the condition lever is set at "start," the pitch control immediately functions to bring the blades to flat pitch. Engine starting is then accomplished by operation of conventional starter and ignition switches and associated apparatus (not shown) together with proper manipulation of the manual fuel lever 11 that controls valve $V_m$, Figs. 2 and 3, until the turbine has been brought up to 8000 R. P. M., the minimum speed setting of the governor at which point the governor takes over control.

For this minimum speed condition at "start" the control is the same as for "ground idle" so that no change takes place when the condition lever is shifted to "ground idle" except that suitable interlocking means (not shown) between the condition lever 10 and the fuel lever 11 may be used to hold the manually controlled fuel valve $V_m$ locked open. However, it will be understood that the relationship of the manual valve to the condition lever is optional and if desired the manual valve may be free to shut off the fuel under full power conditions. For this purpose an auxiliary lever may be provided if desired for disabling the aforesaid interlock so that the fuel line can be manually throttled in case of emergency, regardless of the condition lever position.

The schedules for "normal operation" and "take-off and landing" are best illustrated by charts in Figs. 11 and 12 respectively. The computer is connected in the control for these two condition settings only. The "normal operation" condition, which does not involve emergency action and may be considered as a normal cruising condition, provides for maintaining maximum turbine R. P. M. throughout the power lever range except from zero to 25% for example. As the power lever is moved from the 25% position to zero, the R. P. M. is reduced from 13,000 R. P. M. to 10,000 R. P. M. in approximately linear relation to torque reduction. This variable R. P. M. control by the power lever is illustrated by Fig. 10, referring particularly to the branch circuit 216. The voltage taken off resistance 216a (which is located in the 0%–25% power range) by the power lever contact 220 determines the position of the balancing potentiometer slider contact 221 and hence the governor speeder spring adjustment.

In the "take-off and landing" position of the condition lever, Figs. 10 and 12, the maximum R. P. M. (13,000) is realized since the balancing circuit positions the governor motor for maximum R. P. M. only. The condition lever contact 228 at the "take-off and landing" position is now directly connected by contact 228e to the voltage tap 219 of branch circuit 215 so that the maximum turbine speed and for positive or negative thrust may suddenly be called for as in combat or landing maneuvers. The above described method of interconnection of power and condition controls will permit the power lever itself to be moved to any desired position regardless of the condition lever, but the power obtained will remain at the values or within the ranges indicated.

When the pilot desires to shut off the engine, either in flight or on the ground, the condition lever is moved to "cut off" and the propeller is automatically feathered as previously described. The fuel to the turbine is also shut off by the manual fuel valve $V_m$, Fig. 3, which at "cut off" is interlocked with the condition lever.

It will be apparent, of course, that various modifications can be made in the control affecting the above schedule without departing from the spirit of the invention. For example, the feathering control can, if desired, be by push button according to common practice and independent of the condition lever. In such a case the propeller could be run to flat pitch at "cut off" requiring but a simple change in the electrical connection to the negative voltage tap of potentiometer 73b from the condition lever contact 88b to 88a. It will also be understood that the tentatively fixed values of temperature, torque and R. P. M. herein mentioned may be varied according to operating requirements and varying turbine characteristics.

It should be understood that this invention is not limited to specific details of construction and arrangement thereof herein illustrated, and that changes and modifications may occur to one skilled in the art without departing from the spirit of the invention.

What is claimed is:

1. A control system for a gas turbine and a variable pitch propeller driven thereby comprising electrical computing means including a plurality of potentiometers, means to adjust said potentiometers according to a plurality of control factors representing operating fluid temperature and pressure conditions associated with turbine operation for deriving an output voltage representing maximum available turbine shaft torque which would result in a given permissible turbine temperature, means connected to said potentiometer for selecting a part of said voltage to represent the percentage of maximum available torque desired means to derive a control quantity representing actual turbine torque, means connected to said selecting means and to said driving means to compare said selected output voltage and the control quantity representing the actual turbine shaft torque productive of a torque error signal and means connected to said comparing means and operated by said torque error signal for adjusting propeller pitch so that the shaft torque equals the selected value of computed torque.

2. A control system for a gas turbine and a variable pitch propeller driven thereby comprising computing means responsive to a plurality of control quantities representing operating fluid temperature and pressure conditions associated with turbine operation for continuously calculating maximum available turbine shaft torque which would result in a given permissible turbine temperature, means for measuring the existing turbine shaft torque, differential means connected to said computing means and to said existing torque measuring means for comparing said computed torque with existing shaft torque, and propeller rate of pitch change control means connected to and adjustable by said differential means and operated by a torque difference resulting therefrom for adjusting the propeller pitch so that said shaft torque equals the value of said computed torque.

3. A control system for a gas turbine and a variable pitch propeller driven thereby comprising electrical computing means responsive to a plurality of control quantities representing operating fluid temperature and pressure conditions associated with turbine operation for deriving an output voltage representing maximum available turbine shaft torque which would result in a given permissible turbine temperature, manual control means connected to said computing means for selecting a fraction of said torque voltage to represent torque currently desired, servo means connected to said control means responsive to said fraction voltage for positioning an element thereof to represent said torque desired, another element adapted to be positioned according to actual turbine shaft torque, means connected to and adjustable according to the position of said elements for comparing the desired computed torque with existing torque, and means connected to said servo means and operated by the resulting differential torque control quantity for adjusting the propeller pitch so that said shaft torque equals the desired amount of computed torque.

4. A control system for a gas turbine and a variable pitch propeller driven thereby comprising electrical computing means controlled according to a plurality of input quantities representing temperature and pressure conditions associated with turbine operation for deriving an output voltage representing maximum available turbine shaft torque which would result in a given permissible turbine temperature, a potentiometer connected to said computing means energized by said available torque voltage, a control operable by the pilot and engaged with said potentiometer for deriving a voltage from said potentiometer representing desired torque up to but not exceeding said available torque, a balancing circuit connected to said potentiometer and including a servomotor responsive to the desired torque voltage producing a signal corresponding to the amount of computed torque, means for sensing existing turbine shaft torque, a differential operatively connected to said servomotor and to said existing torque sensing means, and means connected to and operated by said differential adapted to change propeller pitch according to the differential output so as to equalize the desired torque and existing torque values.

5. A control system for a gas turbine and a variable pitch propeller driven thereby comprising electrical computing means adjustable according to a plurality of control factors representing operating fluid temperature and pressure conditions associated with turbine operation for deriving an output voltage representing maximum available turbine shaft torque which would result in a given permissible turbine temperature, a potentiometer connected to said computing means energized by said computed torque voltage, a control element engaging said potentiometer and operable by the pilot through a range representing proportional torque available for deriving a proportional voltage from said potentiometer, means connected to said potentiometer and said control element responsive to said proportional voltage for producing a signal corresponding to the amount of desired torque, and torque control means conjointly connected to and controlled by said last mentioned responsive means and by means representing the existing turbine shaft torque for adjusting propeller pitch so that the shaft torque equals the desired computed torque.

6. A control system for a gas turbine and a variable pitch propeller driven thereby comprising electrical computing means for calculating continuously the maximum available turbine shaft torque which would result in a given permissible turbine temperature under existing flight conditions, said computing means being connected to and energized from a source of reference voltage and including means for deriving a voltage representing ambient air temperature associated with the turbine, potentiometer means connected to said computing means and energized by said temperature voltage, a plurality of pressure responsive means subject to barometric pressure and ram air pressure associated with the turbine operable in combination and connected to adjust said potentiometer means to derive a torque voltage therefrom representing the aforesaid available maximum torque and means connected to said potentiometer means responsive to said torque voltage producing a signal corresponding to the amount of computed torque; means producing a signal corresponding to the existing amount of turbine shaft torque, and torque control means connected to said last two means and jointly controlled therefrom adapted to vary propeller pitch so as to bring the shaft torque into equality with the computed torque.

7. A control system for a gas turbine and a variable pitch propeller driven thereby comprising computing means operated by a plurality of control quantities representing air temperature and pressure conditions associated with turbine operation for deriving a control quantity representing maximum available turbine shaft torque which would result in a given permissible turbine temperature, a source productive of reference control quantity representing maximum permissible turbine torque based upon turbine structural limitations, selecting means connected to said computing means and source jointly responsive to said reference control quantity and to said derived control quantity for overriding said computing means when the computed torque exceeds the maximum permissible torque based upon structural limitations, and torque control means connected to said selecting means controlled by operation of the said selecting means for adjusting propeller pitch so as normally to maintain actual turbine shaft torque at the indicated computed torque value and in the overriding position to limit said shaft torque to the aforesaid maximum permissible value.

8. A control system for a gas turbine and a variable pitch propeller driven thereby comprising electrical computing means operated by a plurality of control quantities representing air temperature and pressure conditions associated with turbine operation for deriving a first voltage representing maximum available turbine shaft torque which would result in a given permissible turbine temperature, a source of reference voltage representing maximum permissible turbine torque based upon structural limitations, discriminating means connected to said computing means and source jointly responsive to said first and reference voltages for overriding said computing means when the computed torque exceeds the maximum permissible torque value, and torque control means connected to said discriminating means operated by either one of said voltages according to operation of said discriminating means for adjusting propeller pitch so as normally to maintain actual turbine shaft torque at the indicated computed torque value and in the overriding position to limit said shaft torque to the aforesaid maximum permissible value.

9. A control system for a gas turbine and a variable pitch propeller driven thereby comprising electrical computing means adjustable according to factors representing turbine operating conditions, for deriving an output voltage representing maximum available turbine shaft torque which would result in a given permissible turbine temperature, correcting means connected to the computer and controlled according to deviation of actual turbine temperature from said permissible temperature for modifying the aforesaid computer output voltage in a corrected sense, measuring means to produce a control quantity representing actual turbine shaft torque, torque control means connected to said correcting means and to said measuring means normally responsive to said corrected computer voltage and to said control quantity for adjusting propeller pitch so that the shaft torque equals the corrected computed torque, a source of reference voltage representing maximum permissible turbine torque based upon structural limitations, and discriminating means connected to said computing means and source jointly actuated by said torque reference voltage and said corrected computer voltage for overriding said computer when said corrected computer voltage exceeds said reference voltage whereby, said torque control means is jointly operated in response to said torque reference voltage and said shaft torque control quantity to limit the shaft torque to the reference torque value.

10. A control system for a gas turbine and a variable pitch propeller driven thereby comprising electrical computing means responsive to a plurality of control quantities representing operating fluid temperature and pressure conditions associated with turbine operation for deriving a first voltage representing maximum available turbine shaft torque which would result in a given permissible turbine temperature, a source of reference voltage representing maximum permissible turbine torque based upon structural limitations, discriminating means connected to said computing means and source including selectively operable electronic circuits and a relay arranged to be controlled thereby, said electronic circuits being jointly energized by said first and reference voltages for operating said relay according to the relative values of the computed torque and the maximum permissible torque, and torque control means connected to said discriminating means selectively responsive to either one of said voltages according to the operation of said relay for adjusting propeller pitch so as normally to maintain actual turbine shaft torque at the indicated computed torque value or at said maximum permissible value.

11. A control system for a gas turbine and a variable pitch propeller driven thereby comprising electrical computing means controlled by a plurality of flight condition input quantities associated with turbine operation representing respectively ambient temperature, absolute ambient air pressure and ram pressure for deriving an output voltage representing maximum available turbine shaft torque which would result in a given permissible turbine temperature, correcting means connected to said computing means for modifying said output torque voltage to correct for actual turbine temperature, means connected to said correcting means and actuated by the modified output torque voltage for producing a signal corresponding to the amount of computed torque, a device producing a signal corresponding to existing turbine shaft torque, and differential means connected to said correcting means and to said device and actuated by both said computed and existing torque signals for changing propeller pitch according to the differential output so as to equalize the computed and existing torque values.

12. A control system for a gas turbine and a variable pitch propeller driven thereby comprising electrical computing means controlled by a plurality of control factors representing air temperature and pressure conditions associated with turbine operation for deriving an output voltage representing maximum available turbine shaft torque which would result in a given permissible turbine temperature, means adapted to be connected to the turbine for producing a voltage proportional to existing actual turbine temperature, means for producing a substantially fixed reference voltage representing maximum permissible turbine temperature, sensing means connected to said last two mentioned means and actuated by said reference and actual temperature voltages for determining the sense of the voltage difference, correcting means connected to and actuated by said sensing means for correcting and modifying the aforesaid computer output voltage to inject therein the voltage representative of actual turbine temperature, means producing a control quantity proportional to actual turbine shaft torque and torque control means conjointly connected to and actuated by said correcting means and by said means producing a control quantity for adjusting propeller pitch so that the actual shaft torque equals the corrected computed torque.

13. A control system for a gas turbine and a variable pitch propeller driven thereby comprising electrical computing means operated by a plurality of control factors representing operating fluid temperature and pressure conditions associated with turbine operation for deriving an output voltage representing maximum available turbine shaft torque which would result in a given permissible turbine temperature, second means for producing a voltage proportional to existing turbine temperature, third means for producing a substantially fixed reference voltage representing maximum permissible turbine temperature, sensing means including saturable reactors connected to the second and third means energized by said reference and temperature voltages for determining the sense of the voltage difference therebetween, electronic means connected to the sensing means selectively controlled as to sense by said difference voltage, motor means connected to and controlled by operation of said electronic means for correcting and modifying the aforesaid computer output voltage and correcting the computed torque value according to actual turbine temperature, fourth means producing a control quantity proportional to actual turbine shaft torque and turbine torque control means connected to and operated by said motor means and by said fourth means for adjusting propeller pitch so that the shaft torque equals the corrected computed torque.

14. A control system for a gas turbine and a variable pitch propeller driven thereby comprising computing means operated by a plurality of control factors representing turbine operating conditions for deriving a computed control quantity representing maximum available turbine shaft torque which would result in a given permissible turbine temperature, second means for producing a control quantity representing deviation of actual turbine temperature from a reference value, third means connected to said first and second means responsive to presence of said deviation quantity for modifying the computed quantity in accordance therewith, a manual control connected to the first means operable by the pilot for selecting at will a proportional part of the computed quantity to represent torque called for, said manual control being connected to and operative to disable said third means when the control is set for less than substantially full torque and when the turbine temperature is less than the reference value, said third means being operative under all conditions to modify said computed quantity when the turbine temperature is greater than the reference value, and torque control means connected to the computing means actuated by either the modified or unmodified computed quantity for adjusting propeller pitch so that the shaft torque equals the computed torque.

15. In a control system for a turbine and a variable pitch propeller driven thereby for aircraft, means for automatically operating the propeller to substantially flat pitch for a ground-start condition comprising a means to produce control signal quantity corresponding in magnitude to a small negative desired torque and a corresponding blade angle, a manual control operable by the pilot to a "start" position, a servo system connected by said manual control when in "start" position to said control signal quantity producing means, means for producing a signal control quantity proportional to actual blade angle, means connected to both said signal producing means to compare the two signal quantities productive of a blade angle error signal, and means connected to said last mentioned means controlled by the blade angle error signal for changing propeller pitch so as to correspond with the first-named control signal quantity.

16. In a control system for a turbine and a variable pitch propeller driven thereby, means for automatically feathering the propeller comprising a potentiometer energized from a source of voltage producing a signal corresponding to a predetermined positive high turbine torque, a servo system connected to the potentiometer responsive in its instant position to the magnitude of the torque signal, means for producing a signal proportional to actual turbine torque, and means connected to and controlled by both the aforesaid signal producing means according to a difference in signal magnitude for adjusting propeller pitch to a predetermined limit position representing "full feather."

17. In a control system for a turbine and a variable pitch propeller driven thereby, means for automatically feathering the propeller comprising a manual control selectively operable by the pilot to a position representing "cut-off," a source of voltage producing a voltage corresponding to a predetermined positive high turbine torque, a servo system connected to said source when said manual control is at "cut-off" and including a motor, a potentiometer connected to the motor and controlled thereby producing a voltage corresponding to torque called for by the servomotor, said motor being operated by the difference between said high torque voltage and the voltage derived from said potentiometer, means for producing a signal corresponding to existing turbine torque, and differential means connected to said potentiometer and said last mentioned means for producing a high rate of propeller pitch change to "full feather."

18. In a control system for a turbine and a variable pitch propeller driven thereby, a potentiometer, a source of voltage representing negative propeller blade angle connected to the potentiometer, a power lever controlled by the pilot connected to the potentiometer for deriving a voltage from said potentiometer corresponding to a reverse blade angle desired, a servo system connected to said power lever and said potentiometer responsive to said derived voltage for producing a signal corresponding to the reverse blade angle called for, and follow-up means connected to said servo system for changing propeller pitch to correspond with the signal for reverse blade angle.

19. A control system for a turbine and a variable pitch propeller driven thereby comprising computing means adjustable by a plurality of control factors representing turbine operating conditions, and deriving a control quantity representing maximum available turbine shaft torque which would result in a given permissible turbine temperature, means responsive to actual turbine temperature connected to the computing means for modifying said computed control quantity when the turbine temperature deviates from a reference value, a manual condition control operable by the pilot to positions representing different operating conditions, a manual power control operable by the pilot to positions representing proportional amounts of available torque desired, said power control being connected to said computing means and being operable to select a proportional amount of said computed control quantity, first means controlled by said selected control quantity for producing a signal corresponding to called-for torque, second means connected to said first means operated by said signal for adjusting propeller pitch so that the shaft torque equals the corrected computed torque, a governor responsive to turbine speed controlling the fuel supply to said turbine, and means for adjusting the speed setting of said governor connected to the condition control and power control to adjust speed on a predetermined schedule with respect to power.

20. A control system for a turbine and a variable pitch propeller driven thereby comprising electrical computing means adjustable according to a plurality of control factors representing turbine operating conditions for deriving a voltage representing maximum available turbine shaft torque which would result in a given permissible turbine temperature, a potentiometer connected to said computing means energized by said torque voltage, a manual condition control operable by the pilot to positions representing different operating conditions, a second manual control operable by the pilot and connected to said potentiometer for deriving from said potentiometer a voltage representing the proportional amount of power desired, a second potentiometer arranged to be energized from a source of voltage representing negative blade angle also connected to said second manual control for deriving a desired negative blade angle voltage, means connected to both potentiometers controlled by either a positive or negative proportional torque voltage for producing a signal corresponding to called-for torque, means connected to said last means for adjusting propeller pitch so that the actual shaft torque equals the computed torque, a governor responsive to turbine speed for controlling the fuel supply to said turbine, and means for adjusting the speed setting of said governor connected to the condition control and said second control to adjust speed on a predetermined schedule with respect to torque.

21. A control system for a gas turbine and a variable pitch propeller driven thereby comprising means manually controlled by the pilot to select the percentage of available turbine torque desired, computing means fed with control factors representing turbine operating conditions for producing a control quantity proportional to maximum available turbine shaft torque, means for varying propeller pitch, said pitch varying means being connected to said computing means and normally actuated by said control quantity, means connected to said computing means for comparing said control quantity with a reference quantity representing maximum permissible torque based on structural limitations, an override control connected to and actuated by said comparing means when the computed torque exceeds the permissible torque, and means for connecting said override control to said pitch varying means for limiting the maximum torque called for to the permissible value, said override control thereby anticipating the maximum permissible torque value at intermediate settings of the manual control so that the torque called for during the overriding control is approximately in linear relation to the setting of said manual control.

22. A control system for a turbine and a variable pitch propeller driven thereby comprising means for providing a signal as a manifestation of power, a manual condition control operable by the pilot to positions calling for different operating conditions, a manual power control operable by the pilot to positions calling for proportional amounts of available power desired, said power control being operable to select a proportional amount of maximum available power for controlling propeller blade angle, a governor sensitive to turbine speed for controlling the fuel supply to said turbine and means connected to said condition control, said power control and said governor for adjusting the speed setting of said governor according to selective operation of said condition control and also according to joint operation of said condition and power controls.

23. A control system for a turbine and a variable pitch propeller driven thereby comprising means for deriving a control quantity which is a function of maximum available turbine shaft torque, a manual condition control operable by the pilot to positions representing different operating conditions, a manual power control connected to said means and operable to select a fractional part of said control quantity for yielding turbine torque less than the maximum available, means adapted to be connected to the turbine for limiting turbine power to the value selected by said power control, a governor sensitive to turbine speed for controlling the fuel supply to said turbine, and means connected to said governor, said condition control and said power control for adjusting the speed setting of said governor according to selective operation of said condition control and also according to joint operation of said condition and power controls.

24. A control system for a turbine and a variable pitch propeller driven thereby comprising computing means fed by a plurality of control quantities representing turbine operating conditions for deriving a torque control quantity representing maximum available turbine shaft torque, a manual condition control operable by the pilot to positions representing different operating conditions, a manual power control connected to said computing means and operable to select a fractional part of said computed torque quantity, means connected to the power control and actuated by the selected part of said computed torque quantity for controlling propeller pitch, a governor sensitive to turbine speed for controlling the fuel supply to said turbine, and means connected to the governor and to the condition and power control for adjusting the speed setting of said governor according to selective operation of said condition control and also according to joint operation of said condition and power controls.

25. A control system for a gas turbine and a variable pitch aircraft propeller driven thereby, comprising voltage deriving means actuated by flight and turbine operating conditions, a potentiometer for controlling forward thrust of the propeller connected to and operated by said deriving means so as to be energized thereby, a second potentiometer for controlling reverse thrust of the propeller energized by a substantially fixed voltage, an adjustable power demand control member connected to and operating said potentiometers operable through a continuous range between limits representing maximum reverse thrust and maximum forward thrust, for deriving control voltages therefrom and power operating means connected to said potentiometers and controlled by said derived voltages adapted to adjust the blade angle of said propeller to produce positive or negative thrust respectively according to the position of said control member.

26. In a control system for a gas turbine and a variable pitch aircraft propeller driven thereby, deriving means actuated by flight and turbine operating conditions for producing a control quantity representing a limiting factor of turbine operation, manually adjustable power control means connected to said deriving means for selecting a proportional part of said control quantity, operating means connected to said power control means and operated by said proportional control quantity adapted to adjust the blade angle of said propeller, a reference control quantity, means connecting said reference control quantity and said operating means, and a discriminator connected to said power control means jointly actuated by said proportional and reference control quantities for comparing the same, said discriminator including means for over-riding the control of said blade angle operating means by said proportional control quantity and for transferring control to said reference control quantity.

27. In a control system for a gas turbine and a variable pitch aircraft propeller driven thereby, deriving means actuated by flight and turbine operating conditions for producing a variable control quantity representing a limiting factor of turbine operation, power operating means connected to said deriving means controlled by power demand and by said variable control quantity for adjusting the blade angle of said propeller, a fixed control quantity, second means connected to control said power operating means according to said fixed reference control quantity the latter representing a permissible limit of turbine performance, and a discriminator connected to said deriving means and to the fixed quantity jointly controlled by said variable and fixed control quantities for comparing the same, said discriminator including means for transferring the control of said blade angle power operating means from said variable control quantity to said fixed control quantity and vice versa in accordance with said comparison.

28. In a control system for a gas turbine and a variable pitch aircraft propeller driven thereby, first means actuated by flight and turbine operating conditions for producing a variable reference control quantity representing available turbine torque, operating means connected to said first means controlled by power demand and by said torque control quantity adapted to adjust the blade angle of said propeller, a fixed reference control quantity, a second means connected to said operating means to control the same according to said fixed reference control quantity, the latter representing a predetermined limit of turbine torque, and a discriminator connected to said first means jointly controlled by said fixed and torque control quantities for over-riding control of said operating means by the torque control quantity, said discriminator including means operable independently of the power demand for transferring the control of said blade angle operating means to said fixed control quantity thereby inhibiting excessive torque at high power demand.

29. In a control system for a gas turbine and a variable pitch aircraft propeller driven thereby, electrical means actuated by flight and turbine operating conditions for producing a variable control voltage representing a limiting torque factor of turbine operation, operating means connected to said electrical means and actuated by said control voltage adapted to adjust the blade angle of said propeller and thereby controlling turbine torque, and an adjustable power control member representing power demand, interconnecting said electrical means and blade angle operating means for proportioning said control voltage and thereby controlling the energization of said operating means according to fractional power demand.

30. In a control system for a gas turbine and a variable pitch aircraft propeller driven thereby, electrical means actuated by flight and turbine operating conditions for producing a variable control voltage representing a limiting factor of turbine operation, operating means connected to said electrical means and actuated by said control voltage adapted to adjust the blade angle of said propeller, an adjustable control member representing power demand interconnecting said deriving means and blade angle operating means for proportioning said control voltage and thereby controlling the energization of said operating means according to fractional power demand, said power control member being movable through a substantially linear range of power demand from zero to full power for all flight and turbine operating conditions.

31. In a control system for a gas turbine and a variable pitch aircraft propeller driven thereby, electrical means actuated by flight and turbine operating conditions for producing a variable control voltage representing a limiting factor of turbine operation, operating means connected to said electrical means and actuated by said control voltage adapted to adjust the blade angle of said propeller and thereby controlling turbine torque, and adjustable control member representing power demand interconnecting said deriving means and blade angle operating means for proportioning said control voltage and thereby controlling the energization of said operating means according to fractional power demand, a source of indepedent reference control voltage and over-riding control means connected to said electrical means and source jointly operated by said variable control voltage and said reference control voltage for transferring, according to the relative values of said voltages, the control of said blade angle operating means from said variable control voltage to said reference control voltage and vice versa, said over-riding control means functioning independently of the position of said power control member thereby anticipating over-riding of said variable control voltage throughout the range of power demand.

32. A control system for a gas turbine and variable pitch aircraft propeller combination for regulating propeller blade angle comprising means adapted to produce a signal proportional to variations in turbine shaft torque, operating means connected to said means controlled by said torque signal adapted to adjust blade angle to the zero thrust position upon demand for minimum power, follow-up means adapted to be connected to said propeller and actuated by actual blade angle change for also at times controlling said propeller, and means adapted to be connected to said propeller operable upon the blade reaching a predetermined low blade angle, representing substantially zero thrust for a predetermined flight condition for over-riding control by the torque signal and transferring the blade angle control from said torque signal to said blade angle follow-up means, thereby precluding inadvertent reversal of blade angle.

33. A control system for a gas turbine and variable pitch aircraft propeller combination for regulating propeller blade angle, comprising means adapted to produce a signal proportional to variations in turbine shaft torque, a control member adjustable to demand positive or negative thrust, operating means connected to said means controlled by said torque signal adapted to adjust blade angle, means connected to and correlating said torque signal producing means, control member and operating means for adjusting said blade angle in positive pitch according to positive thrust demand, blade angle over-ride means adapted to be connected to said propeller and positioned according to actual blade angle and operable at a predetermined low reference angle for over-riding the torque signal control of said operating means so as to hold blade angle at said reference angle in accordance with minimum thrust demand independently of actual torque, and blade angle follow-up means connected to and responsive to the positioning of said control member for adjusting blade angle in negative pitch in accordance with negative thrust demand.

34. A control system for a gas turbine and a variable pitch propeller driven thereby, wherein in the turbine, the maximum permissive power thereof for a limiting turbine temperature and at a preset R. P. M. is a function of turbine operating fluid temperature and pressure conditions, comprising a computer having an output element yielding a signal representing a force component of permissive power, a plurality of sensors for said operating fluid temperature and pressure conditions, each of said sensers being connected to said computer to feed input signals thereto, a power senser producing a signal which is adapted to be a function of the force component of actual turbine power, means connected to the computer and power senser comparing the actual power component signal and the computed power component signal and producing therefrom a power component error signal, and means connected to said comparing means operated by said error signal adapted to adjust the pitch of said propeller.

35. A control system for a gas turbine and a variable pitch propeller driven thereby, wherein in the turbine the maximum permissive power thereof for a limiting turbine temperature and at a preset R. P. M. is a function of turbine operating fluid temperature and pressure conditions, comprising a computer having an output element yielding a signal representing a force component of permissive power, a plurality of sensers for said operating fluid temperature and pressure conditions, each of said sensers being connected to said computer to feed input signals thereto, means connected to said computer to select and pick off a desired percentage of the signal representing a component of permissive power, a power senser producing a signal which is adapted to be a function of the force component of actual turbine power, means connected to the selecting means and to the power senser comparing the actual power component signal and the selected percentage of the computed power component signal and producing therefrom a power component error signal, and means connected to said comparing means operated by said error signal adapted to adjust the pitch of said propeller.

36. A control system for a gas turbine and a variable pitch propeller driven thereby, wherein in the turbine, the maximum permissive power thereof for a limiting turbine temperature and at a preset R. P. M. is a function of turbine operating fluid temperature and pressure conditions, comprising a computer having an output element yielding a signal representing a force component of permissive power, a plurality of sensors for said operating fluid temperature and pressure conditions, each of said sensers being connected to said computer to feed input signals thereto, means connected with said computer and adapted to be connected with said turbine to compare the signals representing a force component of permissive power with a signal representing the force component of actual turbine power, producing a power component error signal, and means connected to said comparing means and actuated by said error signal adapted to adjust propeller pitch.

37. A control system for a gas turbine and a variable pitch propeller driven thereby, wherein in the turbine, the maximum permissive power thereof for a limiting turbine temperature and at a preset R. P. M. is a function of turbine operating fluid temperature and pressure conditions, comprising a computer having an output element yielding a signal representing a force component of permissive power, a plurality of sensors for said operating fluid temperature and pressure conditions, each of said sensers being connected to said computer to feed input signals thereto, means connected with said computer for manually selecting a desired percentage of the permissive power component signal, means connected with said selecting means and adapted to be connected with said turbine to compare the selected part of the permissive power component signal with a signal representing the force component of actual turbine power, producing a power component error signal, and means connected to said comparing means actuated by the power component error signal adapted to adjust propeller pitch.

38. A control system for an air consuming gas turbine and a variable pitch propeller driven thereby wherein in the turbine, a maximum permissive power thereof for a limiting turbine temperature and at a preset R. P. M. is a mathematical function of ambient air temperature, ambient air pressure and pressure of ram air entering the turbine, comprising an electrical computer having an output voltage of amount representing a force component of permissive power, an ambient air temperature senser, an ambinent air pressure senser, a ram air senser sensing the pressure of air entering said turbine, each of said sensers being connected to said computer to feed electrical input signals thereto, means connected to said computer for selecting part of said voltage to represent a desired force component of turbine power, means connected to said selecting means to convert said voltage to a signal representing a desired force component of turbine power, means connected to said converting means and adapted to be connected to said turbine to compare said desired power component signal with a signal representative of the force component of actual turbine power, productive of a power component error signal, and means connected to said comparing means, operated by the error signal, adapted to adjust propeller pitch.

39. A control system for an air consuming gas turbine and a variable pitch propeller driven thereby, wherein in the turbine, maximum permissive power thereof for a limiting turbine temperature and at a preset R. P. M. is a mathematical function of ambient air temperature, ambient air pressure, and pressure of ram air entering the turbine, comprising a computer having an output element yielding a signal representing a force component of permissive power, an ambient air temperature senser, an ambient air pressure senser, a ram pressure senser sensing the pressure of air entering said turbine, each of said sensers being connected to said computer to feed input signals thereto, means adapted to be connected to said turbine to produce a signal representative of the force component of actual turbine power, a differential connected to said computer and said last named means fed by said computer output signal and by said actual power component signal producing an error signal which is the difference between the signals fed to the differential, and control means connected to said differential, and adapted to be connected to said propeller for adjusting the rate of propeller pitch change, and operated by said error signal.

40. In a control system for a gas turbine driving a variable pitch propeller, means for operating the propeller blades automatically to substantially flat pitch for starting the turbine comprising a control quantity of a magnitude and direction to represent a small negative desired propeller blade angle, a manual control adjustable to a "start" position, a servo system connected by operation of said manual control to said "start" position, to said control quantity for operation of the servo system, said servo system having an output element adapted to be connected to the propeller to change the pitch thereof, pitch responsive means adapted to be connected to the propeller and movable in accordance with the pitch thereof, and means connected to said servo system and to said pitch responsive means to disable said servo system when the propeller blade attains the angle represented by said control quantity.

41. In a control system for a turbine and a variable pitch propeller driven thereby, means for automatically operating the propeller to positive or negative pitch as called for by the pilot, comprising a potentiometer energized from a source of voltage representing positive desired torque and producing a torque control quantity, a second potentiometer energized from a source of voltage representing negative blade angle and producing a blade angle control quantity, a self-balancing servo system arranged selectively to be connected by the pilot to either one of said potentiometers for activating the corresponding torque or blade angle quantity called for, control means adapted to be connected to the pitch changing mechanism of the propeller and said servo system for changing propeller pitch so as to correspond with either the desired blade angle quantity or the torque control quantity, means productive of a signal representing existing turbine shaft torque, said control means including a pair of differential devices connected in series, one of said devices being connected to said servo system and said means productive of a signal representing existing turbine shaft torque for producing a control quantity representing torque difference between the desired and actual torques, the second differential device being normally held for positive pitch in a position for transmitting without modification said torque difference control quantity to said pitch changing mechanism; means for indicating propeller pitch, and means interconnecting said second difference, said existing torque signal means and said propeller pitch indicating means for disabling said existing torque signal means and for controlling said second differential device when propeller pitch becomes negative, so that both differential devices function in combination as follow-up means for said servo system throughout the range of called-for reverse blade angle.

GEORGE P. KNAPP.
WILLIAM E. BURNS.
WILLIAM P. ROBBINS.
RAYMOND T. ZWACK.

References Cited in the file of this patent

UNITED STATES PATENTS

| Number | Name | Date |
|---|---|---|
| 1,374,786 | Walker | Apr. 21, 1921 |
| 2,231,292 | Neugebauer | Feb. 11, 1941 |
| 2,292,288 | Pescara | Aug. 4, 1942 |
| 2,293,912 | Mullen | Aug. 25, 1942 |
| 2,300,419 | Hammond et al. | Nov. 3, 1942 |
| 2,306,953 | Jung | Dec. 29, 1942 |
| 2,322,303 | Martin | June 22, 1942 |
| 2,352,786 | Hammond et al. | July 4, 1944 |
| 2,391,323 | Martin | Dec. 18, 1945 |
| 2,432,320 | Lilley | Dec. 9, 1947 |
| 2,446,658 | Maynard | Aug. 10, 1948 |
| 2,457,595 | Orr, Jr. | Dec. 28, 1948 |
| 2,525,460 | Roesch | Oct. 10, 1950 |